US012741205B2

(12) United States Patent
Ren et al.

(10) Patent No.: US 12,741,205 B2
(45) Date of Patent: Sep. 22, 2026

(54) DATA PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Tao Ren, Shenzhen (CN); Youwei Hua, Shenzhen (CN); Binsheng Xu, Shenzhen (CN); Yingkun Xi, Shenzhen (CN); Yong Li, Shenzhen (CN); Kun Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 780 days.

(21) Appl. No.: 17/962,822

(22) Filed: Oct. 10, 2022

(65) Prior Publication Data

US 2023/0032554 A1 Feb. 2, 2023

Related U.S. Application Data

(63) Continuation of application No. PCT/CN2021/102941, filed on Jun. 29, 2021.

(30) Foreign Application Priority Data

Aug. 28, 2020 (CN) ......................... 202010883519.4

(51) Int. Cl.
*A63F 13/358* (2014.01)
*A63F 13/48* (2014.01)

(52) U.S. Cl.
CPC ............ *A63F 13/358* (2014.09); *A63F 13/48* (2014.09); *A63F 2300/534* (2013.01); *A63F 2300/538* (2013.01); *A63F 2300/636* (2013.01)

(58) Field of Classification Search
CPC .. A63F 13/358; A63F 13/48; A63F 2300/534; A63F 2300/538
See application file for complete search history.

(56) References Cited

U.S. PATENT DOCUMENTS 8,414,390 B1 * 4/2013 Paleja .................. A63F 13/358 463/43
10,423,782 B2 9/2019 Muttik et al.
(Continued)

FOREIGN PATENT DOCUMENTS

CN 101283339 A 10/2008
CN 102055727 A 5/2011
(Continued)

OTHER PUBLICATIONS

The European Patent Office (EPO) The Extended European Search Report for 21859846.4, Oct. 18, 2023 11 Pages.
(Continued)

*Primary Examiner* — Ankit B Doshi
(74) *Attorney, Agent, or Firm* — Anova Law Group, PLLC

(57) ABSTRACT

A data processing method includes: obtaining a cloud gaming data obtaining request transmitted by a game client; starting a game process according to the cloud gaming data obtaining request in a cloud container corresponding to the game client; allocating, in the cloud container, a frame buffer for the game process; invoking, in response to the frame buffer being allocated, a graphics rendering library to obtain a graphics rendering instruction; accessing a physical rendering device associated with the frame buffer based on the graphics rendering instruction, and performing intra-container rendering on game data corresponding to the game
(Continued)

process, to obtain rendered game data; and generating a composited game picture according to the rendered game data.

20 Claims, 14 Drawing Sheets

(56) References Cited

U.S. PATENT DOCUMENTS 11,344,799 B2 * 5/2022 Cerny ................ H04N 21/2402
2010/0124992 A1 * 5/2010 Park ........................ A63F 13/45 463/43
2012/0283017 A1 * 11/2012 Ahiska .................. A63F 13/358 463/40
2012/0299940 A1 * 11/2012 Dietrich, Jr. ........... H04N 19/61 345/522
2014/0024457 A1 * 1/2014 Justice .................. A63F 13/355 463/43
2016/0199731 A1 * 7/2016 Mamtani ................. A63F 13/35 463/42
2018/0361235 A1 * 12/2018 Hunter ................ H04L 67/5681
2019/0065619 A1 * 2/2019 Kuo .................... G06F 16/9574
2019/0308099 A1 * 10/2019 Lalonde ................ A63F 13/352
2020/0210241 A1 * 7/2020 Kim .......................... G06T 1/20
2020/0230499 A1 * 7/2020 Buser ...................... H04L 43/04
2021/0129019 A1 * 5/2021 Colenbrander ....... H04L 65/765
2021/0208951 A1 * 7/2021 He ............................ G06T 1/20

FOREIGN PATENT DOCUMENTS

CN 103888485 A 6/2014
CN 111084983 A 5/2020
CN 111214828 A 6/2020
CN 111450528 A 7/2020
CN 111729293 A 10/2020
WO WO-2014186858 A1 * 11/2014 ............ H04L 67/60

OTHER PUBLICATIONS

China National Intellectual Property Administration (CNIPA) Office Action 1 for 202010883519.4, Oct. 15, 2020 12 Pages (including translation).

The World Intellectual Property Organization (WIPO) International Search Report for PCT/CN2021/102941 Sep. 24, 2021 8 Pages (including translation).

* cited by examiner

FIG. 8

DATA PROCESSING METHOD AND APPARATUS, AND STORAGE MEDIUM

CROSS-REFERENCES TO RELATED APPLICATIONS

This application is a continuation application of PCT Patent Application No. PCT/CN2021/102941, entitled "DATA PROCESSING METHOD AND DEVICE AND STORAGE MEDIUM" and filed on Jun. 29, 2021, which claims priority to Chinese Patent Application No. 202010883519.4, entitled "DATA PROCESSING METHOD AND APPARATUS AND STORAGE MEDIUM" filed with the China National Intellectual Property Administration on Aug. 28, 2020, the entire contents of both of which are incorporated herein by reference.

FIELD OF THE TECHNOLOGY

The present disclosure relates to the field of computer calculation, and specifically, to the field of cloud technologies, and in particular, to a data processing method and apparatus and a storage medium.

BACKGROUND OF THE DISCLOSURE

A cloud game is run at a server, and game pictures may be rendered at the server and returned to a terminal corresponding to a game player for display. In some existing cloud games, an operating system (OS) (for example, Android system) executing the game needs to send graphics rendering tasks to an external rendering device, which may increase rendering time delay and consequently lower a frame rate of the game in a large-scale cloud gaming running scene.

Since graphics rendering is performed externally (i.e., outside the operating system), different rendering manners used within the operating system and outside the operating system (e.g., on the external rendering device) may need to be switched in advance. Sometimes, erroneous switching can occur during format rendering performed outside the system. For example, when game rendering is performed externally, it is possible that only 40% of the game may be normally rendered, reducing compatibility of the game.

SUMMARY

Embodiments of the present disclosure provide a data processing method and apparatus and a storage medium, to enhance compatibility of a game and reduce a rendering time delay.

According to one aspect of the embodiments of the present disclosure, a data processing method is provided, including: obtaining a cloud gaming data obtaining request transmitted by a game client; starting a game process according to the cloud gaming data obtaining request in a cloud container corresponding to the game client; allocating, in the cloud container, a frame buffer for the game process; invoking, in response to the frame buffer being allocated, a graphics rendering library in the cloud container to obtain a graphics rendering instruction; accessing a physical rendering device associated with the frame buffer based on the graphics rendering instruction, and performing intra-container rendering on game data corresponding to the game process through the physical rendering device, to obtain rendered game data corresponding to the game process; and generating a composited game picture according to the rendered game data.

According to one aspect of the embodiments of the present disclosure, a data processing method is provided, including: transmitting a cloud gaming data obtaining request to a cloud server in response to a trigger operation for a game client, the cloud gaming data obtaining request being used for instructing the cloud server to start a game process; and allocating, in the cloud container, a frame buffer for the game process; invoking, in response to the frame buffer being allocated, a graphics rendering instruction in a graphics rendering library to access a physical rendering device associated with the frame buffer, and performing intra-container rendering on game data corresponding to the game process through the physical rendering device, to obtain rendered game data corresponding to the game process; and receiving a composited game picture generated by the cloud server according to the rendered game data, and displaying the composited game picture in the game client.

According to one aspect of the embodiments of the present disclosure, a computer device is provided, including: a processor and a memory, the processor being connected to the memory, the memory being configured to store program code, and the processor being configured to invoke the program code, to perform the method according to one aspect of the embodiments of the present disclosure.

According to one aspect of the embodiments of the present disclosure, a non-transitory computer-readable storage medium is provided, storing a computer program, the computer program including program instructions, the program instructions, when executed by a processor, causing the method according to one aspect of the embodiments of the present disclosure to be performed.

BRIEF DESCRIPTION OF THE DRAWINGS

To describe the technical solutions in the embodiments of the present disclosure or the related art more clearly, the following outlines the drawings to be used in the description of the embodiments of the present disclosure or the prior art. Evidently, the drawings outlined below are merely a part of embodiments of the present disclosure, and a person of ordinary skill in the art may derive other drawings from the outlined drawings without making any creative effort.

FIG. 8 is a schematic flowchart of a data processing method according to an embodiment of the present disclosure.

DESCRIPTION OF EMBODIMENTS

Figure 1:
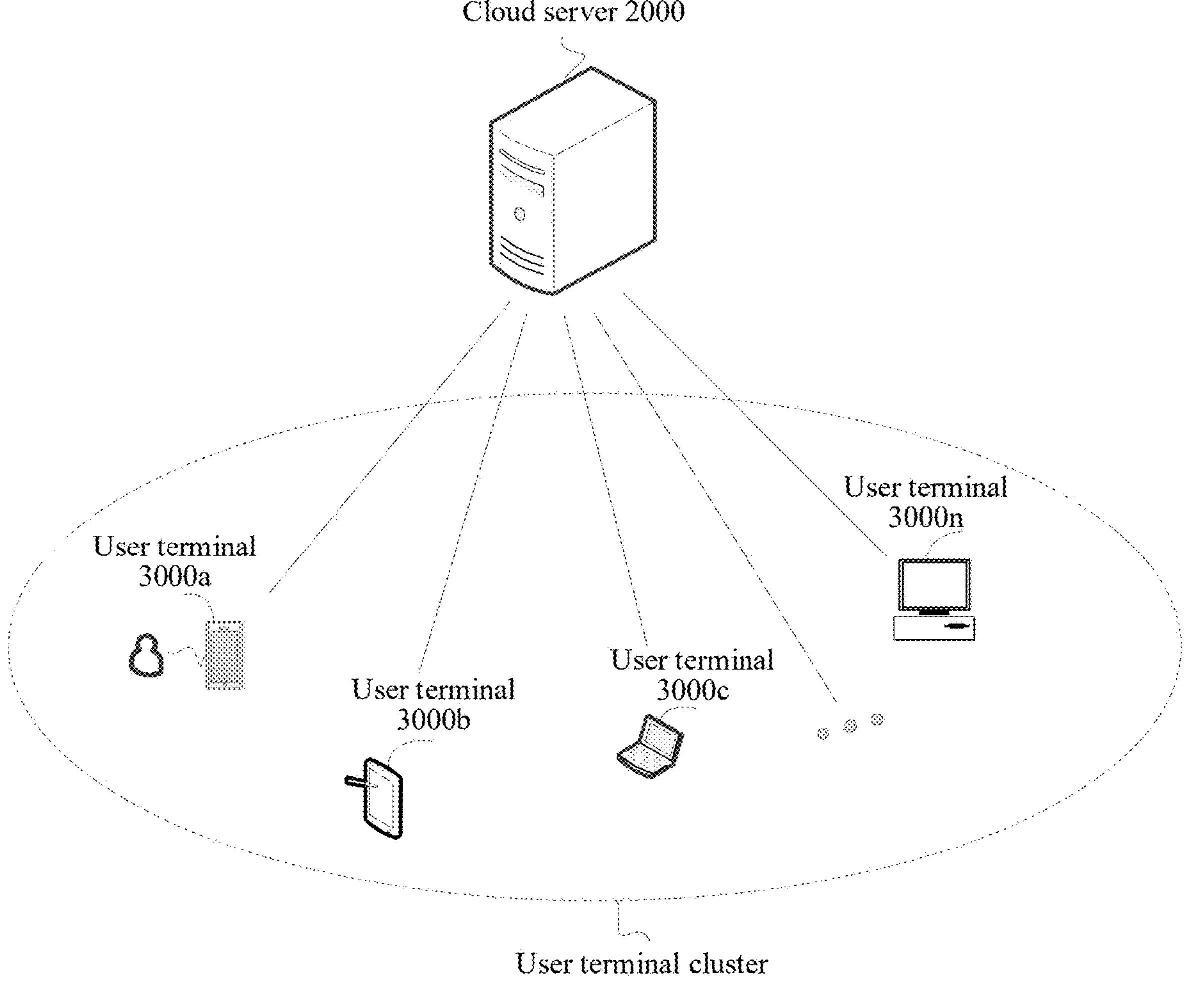
FIG. 1 is a schematic structural diagram of a network architecture according to an embodiment of the present invention.

The technical solutions in embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure relate to the cloud technology, cloud computing, and cloud gaming. The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology will become an important support. A background service of a technical network system requires a large amount of computing and storage resources, such as a video website, an image website, and more portal websites. As the Internet industry is highly developed and applied, each article may have a respective ID in the future and needs to be transmitted to a background system for logical processing. Data at different levels is separately processed, and data in various industries requires strong system support, which can only be implemented through cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid according to usage. As a basic capability provider of cloud computing, a cloud computing resource pool (which is referred to as a cloud platform for short, and is generally referred to as an Infrastructure as a Service (IaaS)) platform is built, and a plurality of types of virtual resources are deployed in the resource pool for external customers to choose for use. The cloud computing resource pool mainly includes: a computing device (a virtualized machine including an OS), a storage device, and a network device.

Cloud gaming, which may also be referred to as gaming on demand, is an online gaming technology based on the cloud computing technology. The cloud gaming technology enables a thin client with relatively limited graphics processing and data computing capabilities to run a high-quality game. In a cloud game scene, the game is not run on a game terminal of a player (may also be referred to as a game terminal corresponding to a game user), but in a cloud server, and the cloud server renders a game scene into video/audio streams, and transmits the video/audio streams to the game terminal of the player through a network. It may be understood that, for example, in the embodiments of the present disclosure, a rendering technology used by the cloud server belongs to an intra-container rendering technology, and a container refers to a virtual cloud container obtained by virtualization in the cloud server. That is, in the embodiments of the present disclosure, video and audio streams obtained by rendering in the cloud container may be transmitted to the game terminal of the player through a network. It may be understood that, the game terminal of the player does not need to have strong graphics computing and data processing capabilities, but only needs to have the basic streaming media playback capability and the capability to obtain input instructions of the player (that is, game user) and send the input instructions of the player to the cloud server.

It may be understood that, in a cloud gaming scene, the player may perform data exchange with the cloud server through the game client run in the game terminal of the player. In this way, after completing a rendering operation on game data in the game client in the cloud container at the cloud, the cloud server may further perform an encoding operation on audio and video data of a game picture obtained by rendering, and deliver encoded data streams (for example, an audio stream and a video stream) to the game terminal of the player to perform a decoding operation.

Further, referring to FIG. 1, FIG. 1 is a schematic structural diagram of a network architecture according to an embodiment of the present invention. As shown in FIG. 1, the network architecture may be applied to a data processing system in a game scene. The data processing system may specifically include a cloud server 2000 and a user terminal cluster shown in FIG. 1. The user terminal cluster may specifically include one or more user terminals, and the quantity of user terminals in the user terminal cluster is not limited. As shown in FIG. 1, a plurality of user terminals may specifically include a user terminal 3000*a*, a user terminal 3000*b*, a user terminal 3000*c*, . . . , and a user terminal 3000*n*. As shown in FIG. 1, the user terminal 3000*a*, the user terminal 3000*b*, the user terminal 3000*c*, . . . , and the user terminal 3000*n* may each establish a network connection to the cloud server 2000, so that each user terminal can exchange data with the cloud server 2000 through the network connection.

The cloud server 2000 shown in FIG. 1 may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

It is to be understood that, in a game scene, as shown in FIG. 1, a game client may be installed in each user terminal in the user terminal cluster. When running in the user terminals, the game client may exchange data with the cloud server 2000 shown in FIG. 1 respectively. It may be understood that, the game client may include a racing game client, a parkour game client, a shooting game client, a chess and card game client, and the like. For ease of understanding, in this embodiment of the present disclosure, one user terminal may be selected from the plurality of user terminals shown in FIG. 1 as a game terminal. The game terminal may include an intelligent terminal having a multimedia data loading function, such as a smartphone, a tablet computer, a notebook computer, a desktop computer, or a smart television. For example, in this embodiment of the present disclosure, the user terminal 3000*a* shown in FIG. 1 may be used as a game terminal, and the game terminal may specifically include, but not limited to, a mobile game terminal.

It may be understood that, in the data processing system, the game client may be respectively deployed in a game terminal (for example, the foregoing user terminal 3000*a* in the embodiment corresponding to FIG. 1) and a back-end server (for example, the foregoing cloud server 2000 in the embodiment corresponding to FIG. 1). In this way, a data processing method provided in the embodiments of the present disclosure may relate to the foregoing field of cloud technologies.

It may be understood that, in this embodiment of the present disclosure, the game terminal may be used as a front end of the game client, and the cloud server 2000 may be used as a back end (that is, the foregoing back-end server) of the game client. In this way, after obtaining a cloud gaming data obtaining request transmitted by the game user in the game terminal, the cloud server 2000 may quickly position a cloud container corresponding to a client environment system in which the game client is located, and then may start a game process according to the cloud gaming data obtaining request in the cloud container (that is, the foregoing container). It may be understood that, the game process may include a required associated process used for instructing to start the game client in the cloud container. In this way, when triggering a game icon of the game client in the game terminal, the game user may start an associated process associated with the game icon in the cloud container, and then may allocate a frame buffer to the started process in the cloud container, to implement internal rendering using an intra-container rendering technology, to obtain, through rendering, a game display interface used for being displayed in the game terminal (for example, a game homepage of the game client). The game display interface may include service controls having corresponding service functions. For example, the service controls mainly refer to controls that can control a game attribute behavior of a virtual object.

The game process may further include one or more associated processes associated with these service controls. For example, when performing data exchange in the client environment system of the game client, the game user may transmit a cloud gaming data obtaining request to the cloud server 2000 based on a trigger event between the game user and the game client. In this way, when receiving the cloud gaming data obtaining request, the cloud server 2000 may start, in the cloud container corresponding to the client environment system of the game client, one or more associated processes associated with a service control, and then the one or more associated processes started in the cloud container may be collectively referred to as a game process associated with the service control. It may be understood that, in this case, when obtaining the frame buffer allocated to the game process, the cloud server 2000 may directly access a graphics rendering library through a bridging channel between the game process and the graphics rendering library in the cloud container. The graphics rendering library may be a Mesa graphics library, and the Mesa graphics library may be understood as a user mode graphics drive, which may be used for providing a rendering service between a game (for example, a game process) and a cloud gaming environment system (for example, an Android system virtualized in the cloud server). Based on this, when accessing the graphics rendering library (for example, Mesa graphics library) in the cloud container, the cloud server may directly perform graphics rendering in the cloud container, to obtain rendered game data corresponding to the game process.

Figure 2:
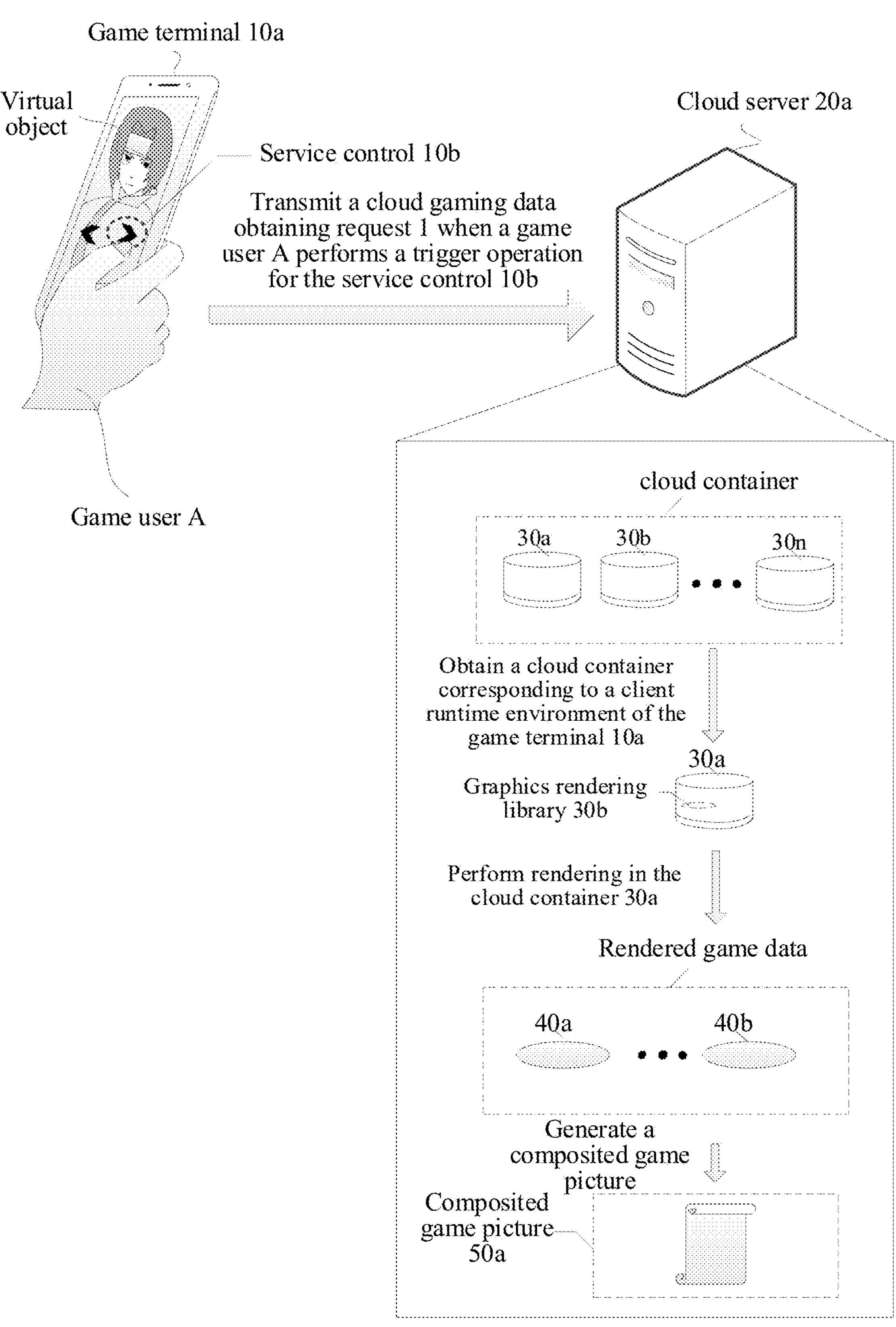
FIG. 2 is a schematic diagram of a scenario of performing data exchange in a cloud gaming scene according to an embodiment of the present disclosure.

For ease of understanding, further, FIG. 2 is a schematic diagram of a scenario of performing data exchange in a cloud gaming scene according to an embodiment of the present disclosure. A cloud server 20*a* shown in FIG. 2 may be the cloud server 2000 in the embodiment corresponding to FIG. 1, and a game terminal shown in FIG. 2 may be any user terminal in the embodiment corresponding to FIG. 1. For ease of understanding, in this embodiment of the present disclosure, an example in which the user terminal 3000*a* shown in FIG. 1 is used as the game terminal is taken, to describe a specific process of performing data exchange between the cloud server 20*a* and the game terminal 10*a* shown in FIG. 2.

It may be understood that, the foregoing game client (for example, a client of a cloud game X) may run in the game terminal 10*a* shown in FIG. 2, and a game display page corresponding to the cloud game X may display a virtual object shown in FIG. 2. It may be understood that, the game display page may further include a service control used for making a request, from the cloud server 20*a* shown in FIG. 2, for controlling a game attribute behavior of the virtual object (for example, a service control 10*b* shown in FIG. 2). As shown in FIG. 2, when a game user A performs a trigger operation for the service control 10*b*, the game terminal 10*a* may transmit, in response to the trigger operation for the service control 10*b*, a cloud gaming data obtaining request 1 shown in FIG. 2 to the cloud server 20*a* shown in FIG. 2. It may be understood that, the cloud gaming data obtaining request may be used for instructing the cloud server 20*a* to perform rendering in a cloud container 30*a* shown in FIG. 2, to obtain rendered game data shown in FIG. 2.

It may be understood that, the cloud gaming data obtaining request 1 may be used for instructing the cloud server 20*a* to start one or more associated processes associated with the service control 10*b*. In this embodiment of the present disclosure, the one or more associated processes started by the cloud server 20*a* and associated with the service control 10*b* may be collectively referred to as a game process associated with the service control 10*b*. In this way, the cloud server 20*a* may allocate a frame buffer to each associated process in the cloud container 30*a* shown in FIG. 2. It may be understood that, an address mapping relationship exists between each frame buffer and a video memory in a corresponding physical rendering device in the cloud server 20*a*. For example, in a cloud container, an address of a video memory allocated in a physical rendering device may be used for pointing to a corresponding frame buffer requested in the cloud container.

Based on this, as shown in FIG. 2, the cloud server 20*a* may request K frame buffers for K associated processes associated with the service control 10*b* in the cloud container 30*a*, and each frame buffer may correspond to a video memory address of a video memory, where K may be a positive integer. Therefore, when directly accessing a graphics rendering node in the cloud container 30*a* by using a graphics rendering library shown in FIG. 2 in the cloud container 30*a*, the cloud server 20*a* may perform rendering in the cloud container 30*a*, to obtain rendered game data shown in FIG. 2. As shown in FIG. 2, the rendered game data may specifically include rendered sub-data obtained by rendering game data of each associated process in the cloud container 30*a*. Therefore, after the cloud server 20*a* renders game data of the K associated processes in the cloud container 30*a*, K pieces of rendered sub-data may be obtained, and the K pieces of rendered sub-data may specifically include rendered sub-data 40*a*, . . . , and rendered sub-data 40*b* shown in FIG. 2. It may be understood that, each piece of rendered sub-data may be stored in a video memory address of a corresponding video memory of the cloud server. Further, as shown in FIG. 2, the cloud server 20*a* may generate, based on the rendered game data (that is, the K pieces of rendered sub-data) shown in FIG. 2, a composited game picture shown in FIG. 2, so that the composited game picture may be encoded subsequently and then returned to the game terminal 10*a* shown in FIG. 2.

As shown in FIG. 2, a plurality of cloud containers may run in the cloud server 20*a*, and each cloud container is a container instance. It may be understood that, a remote mobile game runtime environment matching a client environment system (for example, Android system) in a corresponding user terminal (for example, the game terminal 10*a* shown in FIG. 2) may run in each container instance. For example, in this embodiment of the present disclosure, a remote mobile game runtime environment virtualized for each user terminal in the cloud server 20*a* may be collectively referred to as a cloud gaming environment system. For example, the cloud gaming environment system may be a remote Android system virtualized for each user terminal in the cloud server 20*a*. In this way, any cloud container may be used for providing a basic Android runtime environment for a corresponding user terminal.

It may be understood that, the plurality of cloud containers shown in FIG. 2 may be specifically the cloud container 30*a*, a cloud container 30*b*, . . . , and a cloud container 30*n* shown in FIG. 2. The cloud container 30*a* may be a container instance configured by the cloud server 20*a* in advance for the game terminal 10*a* shown in FIG. 2 (for example, the user terminal 3000*a* in the embodiment corresponding to FIG. 1). Similarly, it may be understood that, the cloud container 30*b* may be a container instance configured by the cloud server 20*a* in advance for another game terminal (for example the user terminal 3000*b* in the embodiment corresponding to FIG. 1), the rest can be deduced by analogy, and the cloud container 30*n* may be a container instance configured by the cloud server in advance for another game terminal (for example the user terminal 3000*n* in the embodiment corresponding to FIG. 1). It is to be understood that, in this embodiment of the present disclosure, a cloud container may be configured for each user terminal accessing the cloud server 20*a* through the foregoing game client (for example, the client of the cloud game X). In this way, when data exchange is performed between these user terminals and the cloud server 20*a*, rendering may be performed in the corresponding cloud containers. For specific implementations in which the cloud server 20*a* performs rendering in other cloud containers (for example, the cloud container 30*b*, . . . , and the cloud container 30*n* shown in FIG. 2), to obtain rendered game data, reference may be made to the description of the specific implementation in which data is rendered in the cloud container shown in FIG. 2, to obtain rendered game data, and details are not described one by one herein again.

It may be understood that, in this embodiment of the present disclosure, when determining a cloud container (for example, the cloud container 30*a* shown in FIG. 2) matching the client environment system of the game terminal 10*a*, the cloud server 20*a* may directly access the foregoing graphics rendering node through the graphics rendering library 30*b* in the cloud container 30*a*, to directly implement internal rendering on a corresponding game process in the cloud container 30*a*. That is, in a process of rendering game data of a corresponding game process in the game client, the existing graphics rendering manner may be changed through a reconstructed system graphics stack in the cloud container 30*a*, to implement rendering directly through an internal rendering technology in the cloud container 30*a*, thereby effectively reducing or shortening the rendering time delay. Additionally, because different rendering manners do not need to be switched in the present disclosure, compatibility of the game can be enhanced in the cloud container 30*a*.

For a specific process that the cloud server 20*a* obtains a cloud container, performs rendering through a physical rendering device, and generates a composited game picture, reference may be made to the following embodiments corresponding to FIG. 3 to FIG. 10.

Figure 3:
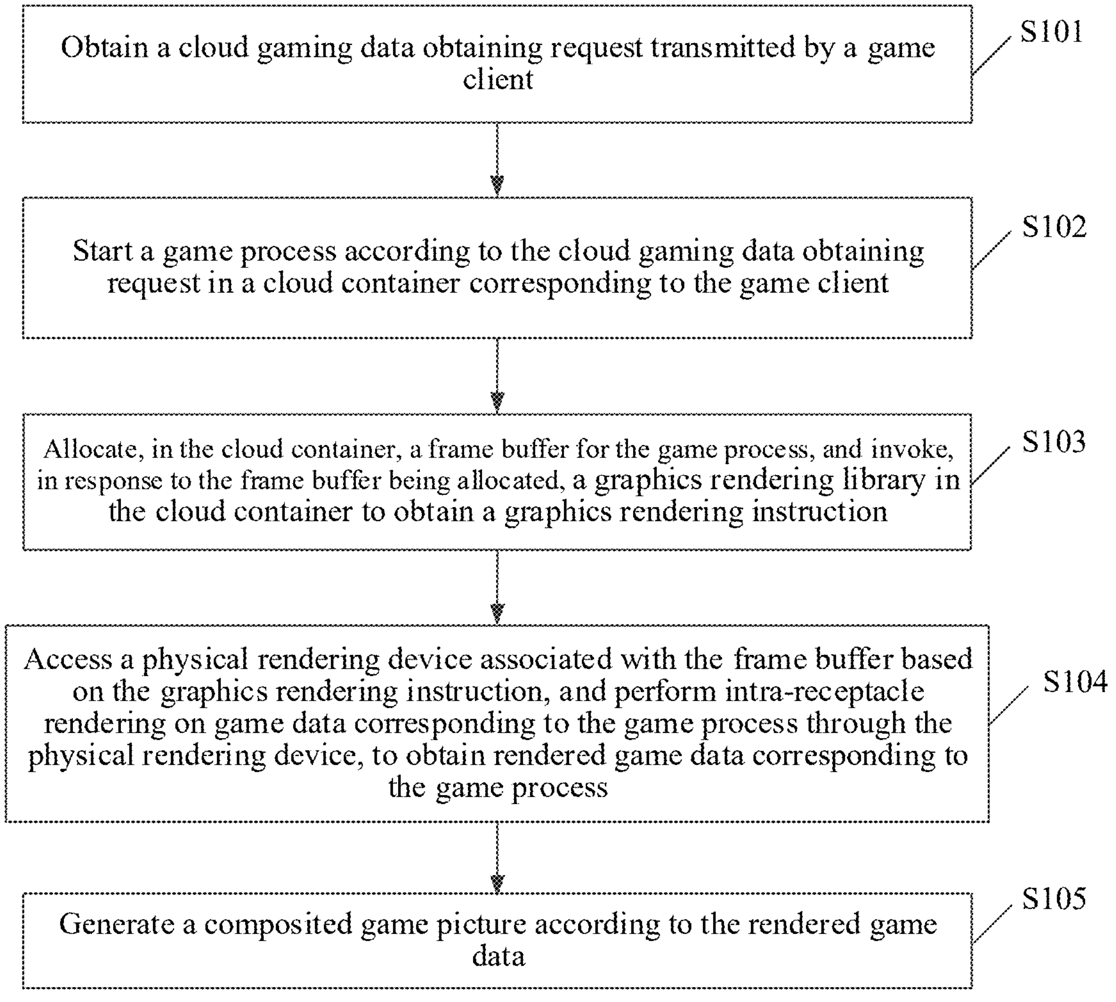
FIG. 3 is a schematic flowchart of a data processing method according to an embodiment of the present disclosure.

Further, FIG. 3 is a schematic flowchart of a data processing method according to an embodiment of the present disclosure. As shown in FIG. 3, the method may be performed by a computer device, a game terminal may run in the computer device, and the game terminal may be the game terminal 10*a* in the embodiment corresponding to FIG. 2; and alternatively, the computer device may be a back-end server corresponding to the game client (in a cloud gaming scene, the back-end server is a cloud server), and the cloud server may be the cloud server 20*a* in the embodiment corresponding to FIG. 2. In other words, the method involved in this embodiment of the present disclosure may be performed by a game terminal corresponding to a game user, or may be performed by a cloud server, or may be performed jointly by a game terminal and a cloud server. For ease of understanding, in this embodiment, a description is made using an example in which the method is performed by a cloud server (for example, the cloud server 20*a* in the embodiment corresponding to FIG. 2), to describe a specific process of obtaining rendered game data corresponding to a game process in the cloud server. The method may include at least the following step S101 to step S105:

Step S101. Obtain a cloud gaming data obtaining request transmitted by a game client.

Specifically, when a data connection relationship is established between a cloud server and a game terminal in which the game client runs, the cloud server may be used for receiving a cloud gaming data obtaining request transmitted by the game client running in the game terminal.

Figure 4:
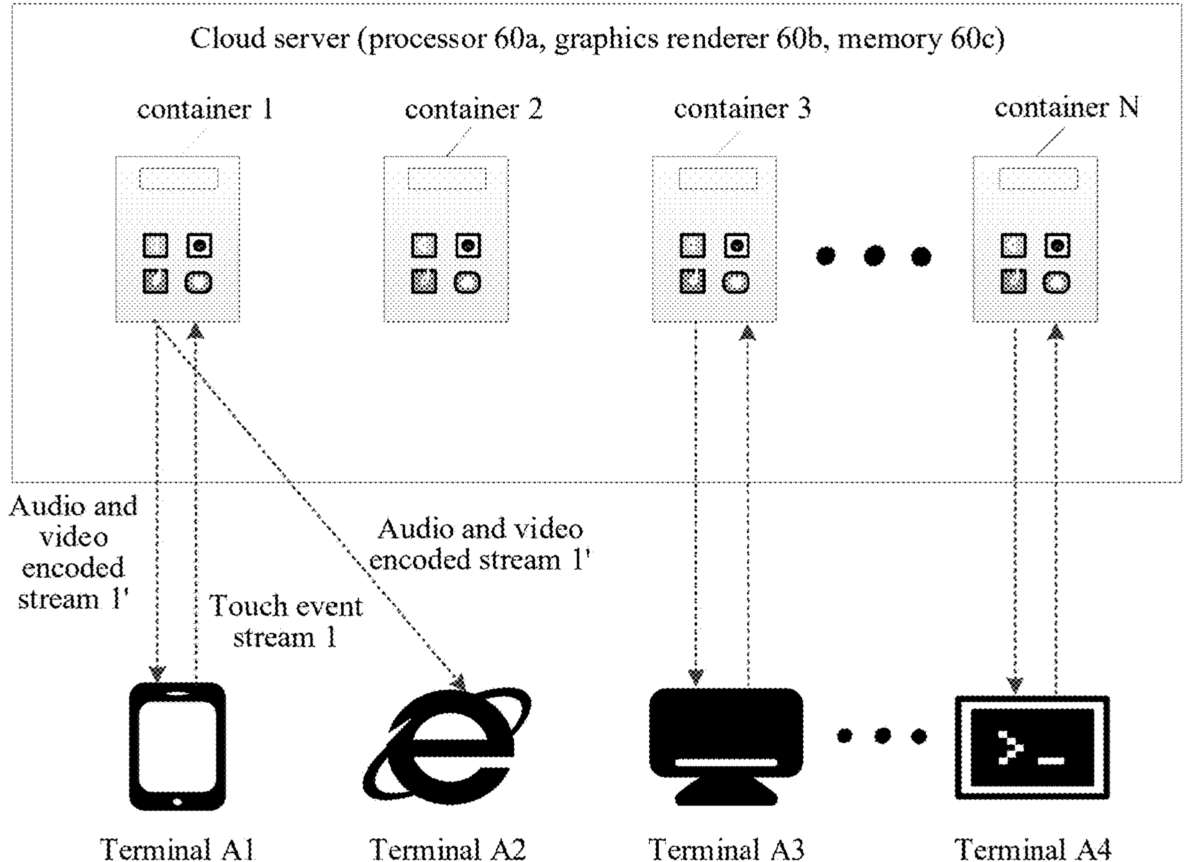
FIG. 4 is a schematic diagram of a scenario of a cloud server according to an embodiment of the present disclosure.

For ease of understanding, Further, FIG. 4 is a schematic diagram of a scenario of a cloud server according to an embodiment of the present disclosure. As shown in FIG. 4, N cloud containers may run in the cloud server, where N may be a positive integer. For example, as shown in FIG. 4, the N cloud containers may be specifically a container 1, a container 2, a container 3, . . . , and a container N shown in FIG. 4. A data connection relationship may be established between each of a terminal A1, a terminal A2, a terminal A3, . . . , and a terminal A4 shown in FIG. 4 and the cloud server shown in FIG. 4. The terminal A1 may be a certain user terminal in the foregoing embodiment corresponding to FIG. 1, for example, the foregoing user terminal 3000*a*. The terminal A2 may be a web terminal associated with the terminal A1. For example, a game user (for example, game user A) may access the terminal A1 and the terminal A2 shown in FIG. 4 through the same account information. In this way, both the terminal A1 and the terminal A2 may subsequently synchronously receive the same audio and video encoded stream delivered by the cloud server for the game user A. It may be understood that, the quantity of other terminals having an association with the terminal A1 is not limited herein.

As shown in FIG. 4, when the game user starts a game client (for example, a client of a cloud game A) through game account information (for example, game account information B1) in the terminal A1, the terminal A1 may establish a data connection relationship with the cloud server, and therefore subsequently may perform data exchange with the cloud server through the established data connection relationship. For example, as shown in FIG. 4, when the game user A performs a trigger operation for a service control in the client of the cloud game A in a unit duration, one or more consecutive trigger operations obtained in the unit duration may be collectively referred to as a touch event stream for the terminal A1. For example, the touch event stream may be a touch event stream 1 shown in FIG. 4. As shown in FIG. 4, in this case, the terminal A1 may add the touch event stream 1 for the service control to a cloud gaming data obtaining request, to transmit the cloud gaming data obtaining request to which the touch event stream 1 is added to the cloud server, so that the cloud server may perform corresponding service logic in the container 1 shown in FIG. 4 through a processor 60*a* shown in FIG. 4. Then, after the service logic is performed, an intra-container rendering technology for the container 1 may be obtained through a graphics renderer 60*b* shown in FIG. 4 in the container 1, to perform rendering in the container 1 using the intra-container rendering technology, and then rendered game data obtained through rendering may be further encoded, to obtain an audio and video encoded stream associated with the touch event stream 1, where the audio and video encoded stream may be an audio and video encoded stream 1' shown in FIG. 4. As shown in FIG. 4, because the game user A further accesses the terminal A2 shown in FIG. 4 through the same game account information (that is, the foregoing game account information B1), when obtaining the audio and video encoded stream 1' shown in FIG. 4 in the container 1, the cloud server may synchronously deliver the audio and video encoded stream 1' to a plurality of terminals associated with the game user A, for example, the terminal A1 and the terminal A2 shown in FIG. 4.

As shown in FIG. 4, the terminal A3 may be a PC terminal. For example, the PC terminal may be the user terminal 3000*n* in the embodiment corresponding to FIG. 1. As shown in FIG. 4, the cloud server may configure the container 3 shown in FIG. 4 for the terminal A3 (for example, a terminal used by a game user B), to obtain an audio and video encoded stream 2' associated with a touch event stream of the game user B (for example, trigger event stream 2, not shown in the figure) in the container 3. Similarly, as shown in FIG. 4, the terminal A4 may be another terminal (for example, a tablet terminal). For example, the tablet terminal may be the user terminal 3000*b* in the embodiment corresponding to FIG. 1. As shown in FIG. 4, the cloud server may configure the container N shown in FIG. 4 for the terminal A4 (for example, a terminal used by a game user C), to obtain an audio and video encoded stream 3' associated with a touch event stream of the game user C (for example, trigger event stream 3, not shown in the figure) in the container N.

It may be understood that, the game user A may be the game user in the embodiment corresponding to FIG. 2. In this case, the cloud gaming data obtaining request may be the cloud gaming data obtaining request 1 transmitted by the game terminal 10*a* in the embodiment corresponding to FIG. 2. For ease of understanding, in this embodiment of the present disclosure, an example in which the game client is the client corresponding to the foregoing game X (for example, client 1) is still taken. In this case, the cloud gaming data obtaining request may be generated by the game client (that is, the client 1 corresponding to the game X) in response to a case that the game user (for example, the game user A in the embodiment corresponding to FIG. 2) performs a trigger operation for the service control in the game display page.

Figure 5:
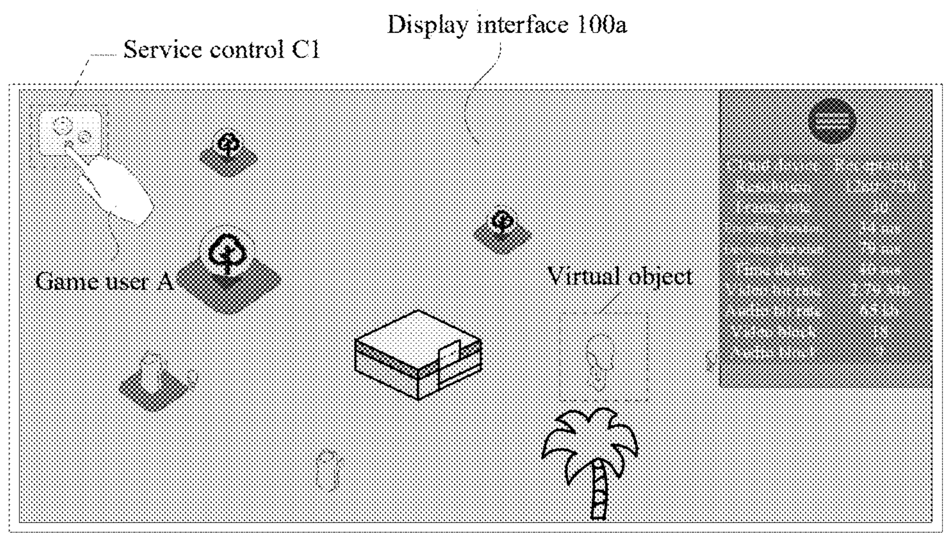
FIG. 5 is a schematic diagram of a scenario of transmitting a cloud gaming data obtaining request according to an embodiment of the present disclosure.
Figure 5:
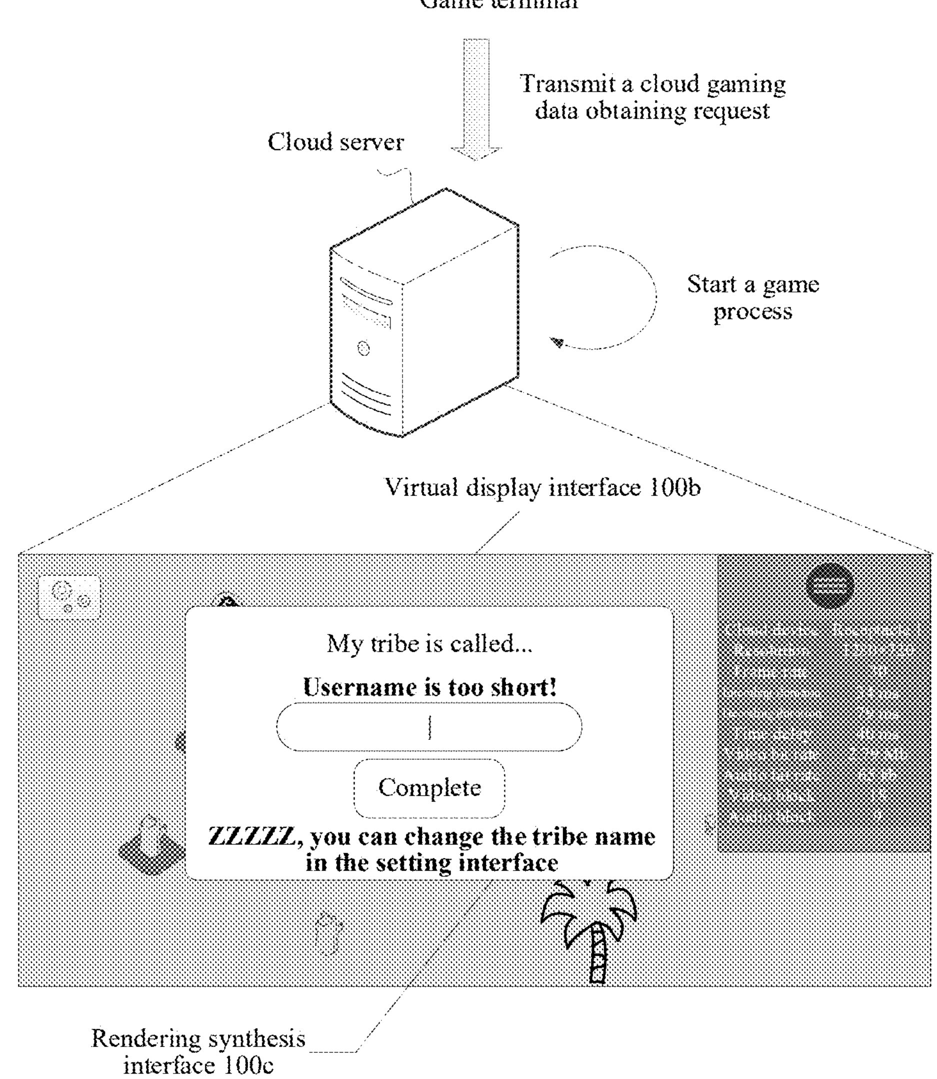

For ease of understanding, Further, FIG. 5 is a schematic diagram of a scenario of transmitting a cloud gaming data obtaining request according to an embodiment of the present disclosure. As shown in FIG. 5, when a game user A starts the foregoing client 1 in a game terminal shown in FIG. 5, a display interface 100*a* shown in FIG. 5 may be obtained, and the display interface 100*a* may be a setting interface in the game client. It may be understood that, in this embodiment of the present disclosure, display interfaces displayed in the game client (that is, the client 1 corresponding to the game X) may be collectively referred to as a game display page. For example, as shown in FIG. 5, the display interface 100*a* may include a service control C1 shown in FIG. 5, and the service control C1 may be a setting control. For example, the setting control may be used for instructing a server shown in FIG. 5 to return to a virtual display interface 100*b* shown in FIG. 5, that is, the virtual display interface 100*b* may be used for instructing the game user 5 to change a game attribute (for example, tribe name) of a virtual object shown in FIG. 5.

For example, specifically, as shown in FIG. 5, the game user A may perform a trigger operation for a service control C1 in the game display interface (that is, the display interface 100*a* shown in FIG. 5) at a moment T1. In this case, the game terminal may respond to the trigger operation for the moment T1, trigger operations performed for the service control C1 (for example, click operation) are collectively referred to as a touch event stream, and a cloud gaming data obtaining request carrying the touch event stream may be further generated. It may be understood that, as shown in FIG. 5, the game client may transmit the foregoing cloud gaming data obtaining request to a cloud server established an association with the game terminal (that is, the cloud server shown in FIG. 5), so that the cloud server may respond to a touch event stream whose input time is the moment T1. For example, as shown in FIG. 5, the cloud server may further perform the following step S102. That is, the cloud server may remotely predict service logic of the game client at a next moment (that is, moment T2) of the moment T1 based on the touch event stream at the moment T1 (the predicted service logic is mainly used for a game attribute behavior of modifying a current game attribute of the virtual object (that is, modifying a current tribe name of the virtual object) in a corresponding cloud container).

When a game display page (for example, the display interface 100*a* shown in FIG. 5) includes a virtual object associated with the game user, and a game display interface in which the virtual object is located includes a service control used for controlling a game behavior of the virtual object in the cloud server (for example, used for controlling a game attribute behavior of moving leftward or rightward of the virtual object in a game map of the game client), after the game user triggers such a service control, the cloud server may further respond to service logic for such a service control, to manipulate a game attribute behavior of the virtual object in a cloud gaming environment system corresponding to the game client.

Step S102. Start a game process according to the cloud gaming data obtaining request in a cloud container corresponding to the game client.

In a specific implementation, the cloud container may correspond to the client environment system in which the game client is located. Specifically, the cloud server may determine, based on the client environment system (for example, Android system) in which the current game client is located, a cloud container corresponding to a cloud gaming environment system (for example, virtualized remote Android system) matching the client environment system; further, the cloud server may extract an attribute behavior event of the virtual object indicated by the service control from the cloud gaming data obtaining request, and may determine a process starting instruction associated with the attribute behavior event; further, the cloud server may input the process starting instruction into the cloud container, control the virtual object to perform the game attribute behavior in the cloud container, and start K associated processes associated with the game attribute behavior, where K is a positive integer; and further, each associated process of the K associated processes may be collectively referred to as a game process associated with the service control for the cloud server.

The attribute behavior event may include the foregoing touch event stream used for changing the game attribute of the virtual object at cloud, and the foregoing another touch event stream used for controlling the game behavior of the virtual object at cloud. It may be understood that, when the game client is a competitive game client, the game attribute may include but not limited to a name of a team participating in competition through team forming. For example, using an example in which the game client is a large-scale cloud gaming tribe conflict, after a game user (for example, the foregoing game user A shown in FIG. 4) triggers the foregoing service control C1 (that is, the setting control) on the foregoing display interface 100*a* (that is, a setting interface on which the setting control C1 is located), the cloud server is further enabled to extract, at cloud, an attribute behavior event (for example, the foregoing touch event stream 1) indicated by the service control C1 and used for changing the tribe name of the foregoing virtual object, and then to determine a process starting instruction associated with the attribute behavior event.

The game display interface may further include the service control used for controlling the game behavior of the virtual object at cloud, for example, the foregoing service control 10*b* shown in FIG. 2. In this case, the service control 10*b* may be a control used for instructing the cloud server to control the virtual object in the game display interface to move rightward at cloud. Therefore, after the foregoing game user A triggers the foregoing service control 10*b* (that is, moves the control rightward), the cloud server is further enabled to extract, at cloud, an attribute behavior event indicated by the service control 10*b* and used for controlling the game behavior of the foregoing virtual object (for example, a new touch event stream 1), and then another process starting instruction associated with the attribute behavior event (for example, the new touch event stream 1) may be determined.

Further, it may be understood that, after obtaining the process starting instruction, the cloud server may further input the process starting instruction to the cloud container corresponding to the client environment system of the game client, for example, the foregoing container 1 shown in FIG. 5, then may control the virtual object to perform service logic corresponding to the game attribute behavior in the cloud container (for example, the container 1), and then may start one or more associated processes associated with the game attribute behavior after performing the service logic. It may be understood that, in this embodiment of the present disclosure, one or more associated processes started in the cloud container (for example, the container 1) may be collectively referred to as a game process associated with the foregoing service control, and then the following step S103 may be further performed.

It may be understood that, by running different cloud containers in the same cloud server, running may be performed directly at a high frame rate (for example, 30 frames per second) in a large-scale cloud gaming scene at cloud. In this way, when a large quantity of user terminals (which may also be referred to as a large quantity of game terminals) concurrently access the cloud server in a unit time, different cloud containers may be configured for the user terminals accessing the cloud server, so that intra-container rendering may be performed subsequently in the pre-configured different cloud containers, thereby resolving the problem in the existing technology that stability is relatively poor because rendering is performed using a undiversified rendering process outside the cloud container, which means that the intra-container rendering in the different cloud containers can effectively improve stability of the entire OS (for example, the foregoing Android system) in rendering at a high frame rate.

Figure 6A:
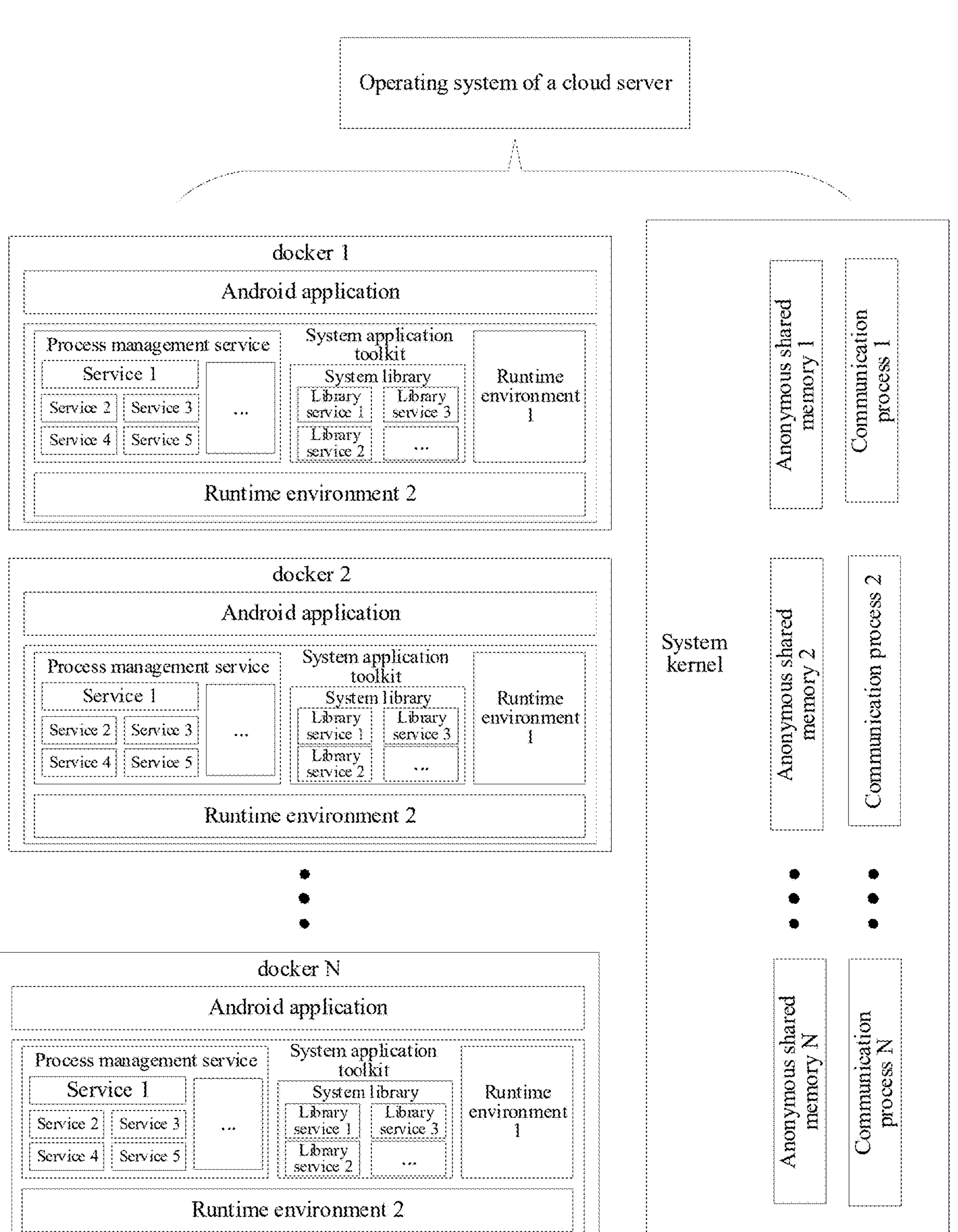
FIG. 6*a* is a schematic diagram of a scenario of running a plurality of Android runtime environments on a cloud server according to an embodiment of the present disclosure.

For ease of understanding, further, FIG. 6*a* is a schematic diagram of a scenario of running a plurality of Android runtime environments on a cloud server according to an embodiment of the present disclosure. An OS of the cloud server shown in FIG. 6*a* may be an open source OS, for example, Linux system. As shown in FIG. 6*a*, in a cloud gaming scene, the cloud server may run a plurality of virtualized cloud gaming environment systems by using containers, that is, one cloud gaming environment system may be run in one container, and the cloud gaming environment system may be a remote game runtime environment virtualized for the client environment system in the corresponding terminal shown in FIG. 4. In addition, it may be understood that, in the cloud server shown in FIG. 6*a*, each docker is a cloud container, and a docker 1 may be the container 1 in the embodiment corresponding to FIG. 4. Similarly, a docker 2 may be the container 2 in the embodiment corresponding to FIG. 4, the rest can be deduced by analogy, and a docker N may be the container N in the embodiment corresponding to FIG. 4. Based on this, it may be understood that. Resources on the same physical server, for example, the same system kernel such as Linux kernel may be shared between a plurality of containers shown in FIG. 6*a* (that is, a plurality of dockers, for example, the container 1, the container 2, the container 3, . . . , and the container N independent of each other).

It may be understood that, the system kernel shown in FIG. 6*a* is the most basic part of the OS shown in FIG. 6*a*, and the system kernel may be a computer program used for managing data I/O requests sent by software, these requests are translated into data processing instructions, and the data processing instructions are submitted to a central processing unit (CPU, for example, the foregoing processor 60*a* shown in FIG. 4) of the cloud server and other electronic components in the cloud server and processed.

It may be understood that, the system kernel usually refers to system software used for providing hardware abstraction layer, magnetic disk and file system control, multi-task, and other functions. In the OS shown in FIG. 6*a*, the system kernel is mainly responsible for managing processes, memory, device drivers, files, network systems, and the like of the system in the cloud server, and deciding performance and stability of the system. Through the system kernel, a set of concise and uniform interfaces may be provided for application software and hardware in the cloud server shown in FIG. 6*a*, so that programming is simpler.

The process management means that the system kernel may be used for being responsible for creating and destructing processes, and processing contact (input and output) between the processes and the external world. It may be understood that, different inter-process communication is also processed by the system kernel (through a signal, a channel, or an inter-process communication primitive).

The memory management means that in this embodiment of the present disclosure, the memory in the cloud server may be collectively referred to as an available resource, and the system kernel can establish a virtual address space for each of all processes in the cloud server on the limited available resource. For example, under a rendering service in the cloud gaming scene, a video memory may be requested for a physical rendering device configured for a game process in a corresponding container, one video memory may correspond to one video memory address, the video memory address may be used for pointing to a frame buffer in a frame buffer component. In this way, the cloud server may quickly perform the following step S103 when obtaining a frame buffer of a corresponding game process.

The file management means that the Linux system is based on the concept of file system to great extent. In this case, the system kernel may establish a structured file system on non-structured hardware, that is, a system library in a corresponding container shown in FIG. 6*a*, and quite a few files in the system library may be applied in the entire system. Additionally, Linux supports a plurality of file system types, that is to say, different data organization manners on a physical medium may be formatted into standard Linux file systems in corresponding cloud containers, for example, a generally used FAT file system and the like.

It may be understood that, the plurality of containers shown in FIG. 1 all belong to a container in which the same Android mirror (for example, an installation package of the foregoing application client) runs in the corresponding game client. It is to be understood that, in the system shown in FIG. 6*a*, communication of a dedicated drive (for example, anonymous shared content drive) of underlying Android and communication of a Binder process are respectively isolated through namespaces. For example, an anonymous shared memory 1, an anonymous shared memory 2, . . . , and an anonymous shared memory N shown in FIG. 6*a* are respectively isolated through namespaces. Similarly, a communication process 1, a communication process 2, . . . , and a communication process N shown in FIG. 6*a* are also respectively isolated through namespaces.

Figure 6B:
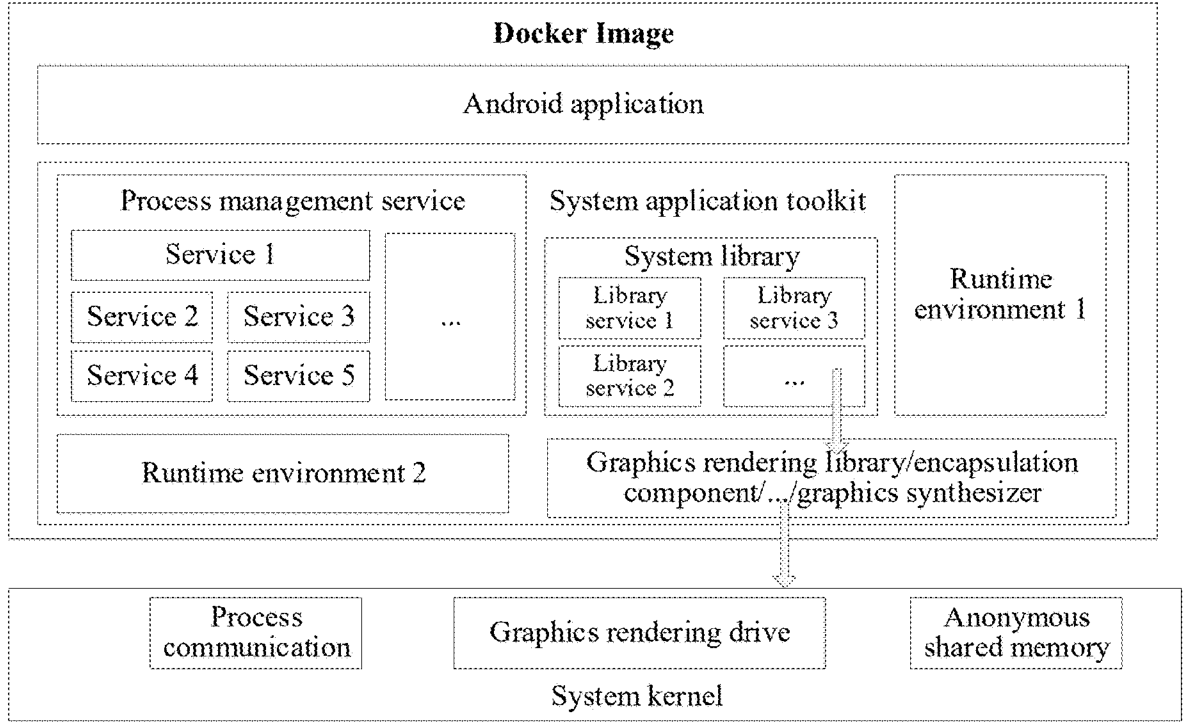
FIG. 6*b* is a schematic diagram of a scenario of invoking a graphics rendering library in a container according to an embodiment of the present disclosure.

For ease of understanding, further, FIG. 6*b* is a schematic diagram of a scenario of invoking a graphics rendering library in a container according to an embodiment of the present disclosure. The docker image shown in FIG. 6*b* may include any container in the foregoing cloud server shown in FIG. 6*a*. For ease of understanding, in this embodiment of the present disclosure, an example in which the container is the docker 1 running in the foregoing cloud server is taken, to describe a specific process of invoking a graphics rendering library in the docker 1 (that is, the foregoing container 1). A game client running in the container shown in FIG. 6*b* may be an Android application shown in FIG. 6*b*, and a runtime environment of the Android application may be a runtime environment 1 and/or runtime environment 2 shown in FIG. 6*b*.

Process management services shown in FIG. 6*b* may specifically include a service 1, a service 2, a service 3, a service 4, a service 5, and the like shown in FIG. 6*b*. The service 1 may be a window management service, that is, one game process may provide one window. The service 2 may be a graphics synthesis service, that is, rendered game data stored in different video memories may be synthesized in the same cloud container, and the synthesized rendered game data is pushed into a frame buffer corresponding to a screen kernel and simulated and outputted. The service 3 may be an installation service corresponding to an installation package (which may be an Android installation package herein, and may also be referred to as an Android mirror) of the game client (that is, the Android application shown in FIG. 6*b*). It may be understood that, when beginning to be installed in the game terminal, the Android mirror may be changed into an Android instance in the game terminal, that is, the Android application corresponding to the Android mirror may run in the game terminal. The service 4 may be a rendering service in a corresponding cloud container. The service 5 may be a process destructing service. The runtime environment 1 in the container may be a runtime environment corresponding to a programming language (for example, Java language) used by a cloud gaming environment system in which the Android application is located. Similarly, the runtime environment 2 in the container may be a runtime environment of another programming language (C language) used by the cloud gaming environment system in which the Android application is located. A system library shown in FIG. 6*b* may be used for providing different system files. For example, under a rendering service corresponding to the container, the system library may include but not limited to the graphics rendering library shown in FIG. 6*b*. In addition, as shown in FIG. 6*b*, the graphics rendering library may include an encapsulation component having an instruction encapsulation function. Based on this, when performing data exchange with a game terminal, the cloud server may further perform the following step S103, to quickly access the encapsulation component shown in FIG. 6*b* through the graphics rendering library shown in FIG. 6*b*, and then may quickly access a graphics rendering drive in the container, to perform rendering in the container.

Step S103. Allocate, in the cloud container, a frame buffer for the game process; and invoke, in response to the frame buffer being allocated, a graphics rendering library in the cloud container to obtain a graphics rendering instruction.

Specifically, the graphics rendering library is invoked through a bridging channel between the game process and the graphics rendering library in the cloud container, to obtain the graphics rendering instruction having a remote mapping relationship with the client environment system. Before performing step S103, the cloud server may transmit a frame buffer request instruction to the frame buffer component through the game process, where the frame buffer request instruction is used for instructing the frame buffer component to transmit a buffer allocation instruction to the buffer allocator; further, the cloud server may invoke, when the buffer allocator allocates a frame buffer for the game process based on the buffer allocation instruction, the graphics rendering drive through the graphics rendering node having an association with the buffer allocator, to allocate a video memory corresponding to the frame buffer in the physical rendering device having a hierarchical relationship with the graphics rendering drive; and further, the cloud server may return a video memory address corresponding to the video memory to the game process, where the video memory address is used for pointing to the frame buffer corresponding to the game process. It may be understood that, the cloud server may further obtain the association between the game process and the graphics rendering library when the frame buffer allocated for the game process is obtained by the cloud server; further, the cloud server may determine the bridging channel between the game process and the graphics rendering library in the cloud container based on the association; and further, the cloud server may invoke the graphics rendering library through the bridging channel, and obtaining the graphics rendering instruction having the remote mapping relationship with the client environment system from the graphics rendering library, and therefore may further perform the following step S103 subsequently.

Figure 7:
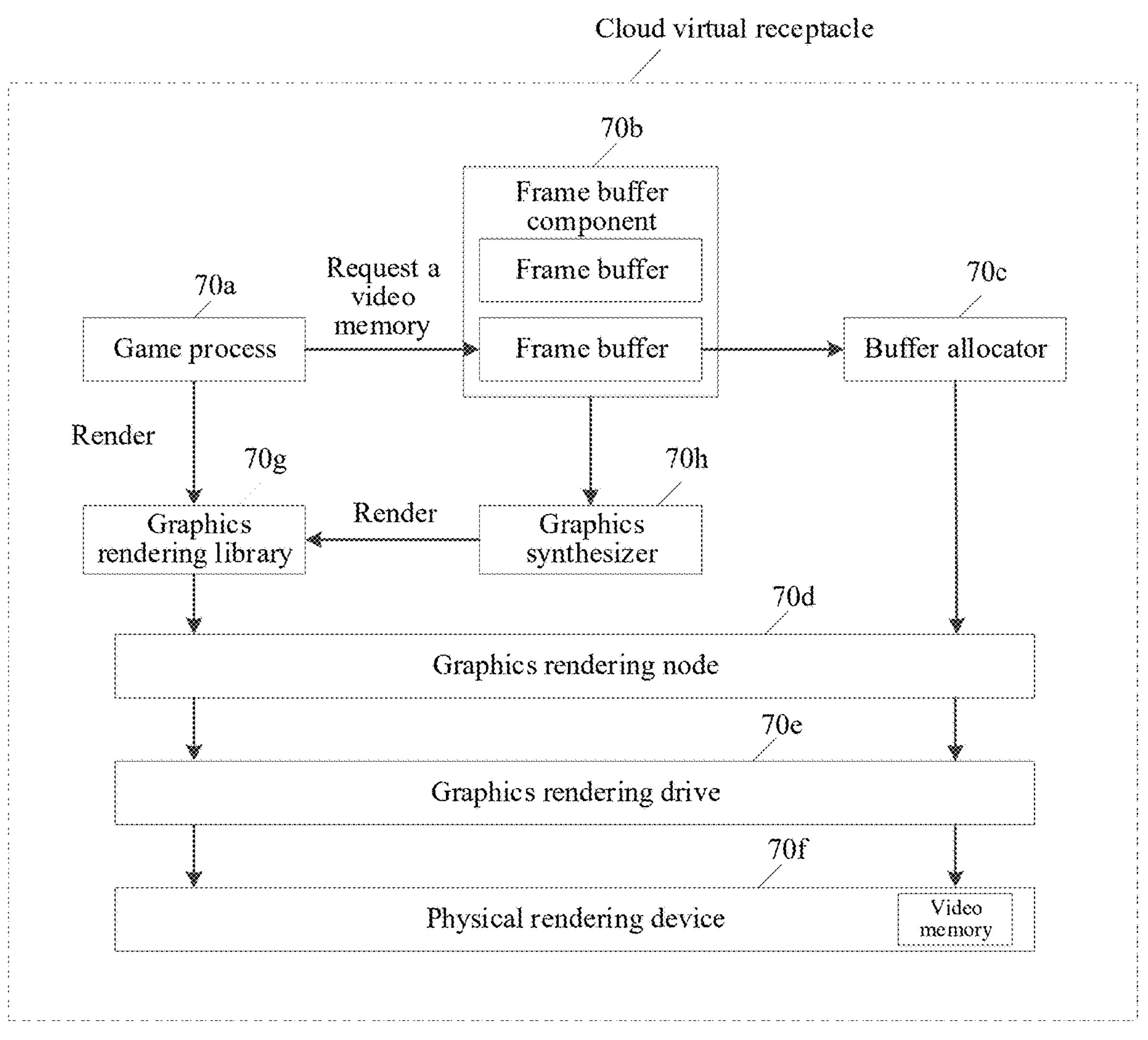
FIG. 7 is a schematic diagram of a scenario of allocating a frame buffer for a game process in a cloud container according to an embodiment of the present disclosure.

For ease of understanding, further, FIG. 7 is a schematic diagram of a scenario of allocating a frame buffer for a game process in a cloud container according to an embodiment of the present disclosure. For ease of understanding, in this embodiment of the present disclosure, an example in which one game process is started in the cloud container is taken. As shown in FIG. 7, the game process may be a game process 70*a* shown in FIG. 7, to describe a specific process of allocating a frame buffer to the game process 70*a* in the cloud container.

It may be understood that, the cloud container shown in FIG. 7 may be a docker in the embodiment corresponding to FIG. 6*a*, for example, the foregoing docker 1 in the embodiment corresponding to FIG. 6*a*. As shown in FIG. 7, the cloud container may include a reconstructed system graphics stack, the system graphics stack may be used for instructing the cloud server to directly access a physical rendering device having a graphics rendering function (for example, a physical rendering device 70*f* shown in FIG. 7) in the cloud container shown in FIG. 7, and then intra-container graphics rendering may be implemented in the cloud container shown in FIG. 7. It may be understood that, the system graphics stack in the cloud container may specifically include: the game process 70*a*, a frame buffer component 70*b*, a buffer allocator 70*c*, a graphics rendering node 70*d*, a graphics rendering drive 70*e*, the physical rendering device 70*f*, a graphics rendering library 70*g*, and a graphics composer 70*h* shown in FIG. 7.

It may be understood that, the intra-container graphics rendering solution provided in this embodiment of the present disclosure (that is, the foregoing internal graphics rendering technology) specifically involves bridging, in the cloud container shown in FIG. 7, a graphics rendering interface (API, Application Programming Interface) of the game process 70*a* inside a cloud gaming environment system (that is, remote Android system) to the graphics rendering library shown in FIG. 7 (the graphics rendering library may be the foregoing Mesa graphics library). This means that in this embodiment of the present disclosure, by using the Mesa graphics library and an encapsulation component in the Mesa graphics library (for example, a libdrm component having an instruction encapsulation function), a graphics rendering operation indicated by the foregoing graphics rendering instruction may be further delivered to the graphics rendering drive 70*e* shown in FIG. 7 (that is, a GPU graphics drive in a kernel mode), and then the physical rendering device 70*f* having a hierarchical relationship with the graphics rendering drive 70*e* may be quickly accessed, to finally complete graphics rendering on specific physical hardware.

As shown in FIG. 7, an association may exist between the graphics rendering library 70*g* and the game process shown in FIG. 7. In this way, when obtaining the frame buffer allocated to the game process shown in FIG. 7 in the cloud container, the cloud server may obtain the association between the game process 70*a* and the graphics rendering library 70*g* in the cloud container, then may determine a bridging channel (for example, a graphics rendering interface invoked in the cloud container and used for instructing to perform graphics rendering inside the Android system) between the game process 70*a* and the graphics rendering library 70*g* in the cloud container through the association, and then may invoke the graphics rendering library through the bridging channel, and obtain a graphics rendering instruction having a remote mapping relationship with the client environment system from the graphics rendering library, and therefore may continue to perform the following step S104 subsequently.

It may be understood that, in this embodiment of the present disclosure, before the foregoing internal graphics rendering technology is performed, a frame buffer may be further allocated in advance to the game process 70*a* shown in FIG. 7 in the cloud container shown in FIG. 7. A specific implementation in which the cloud server allocates a frame buffer to the game process 70*a* may be described as follows:

1) When a game user starts a cloud game (for example, the foregoing cloud game X), a game client of a game terminal used by the game user may establish a connection to the cloud server.

For example, it may be understood that, the cloud server may establish a data connection relationship with the game client. In this way, when the game user performs a trigger operation for a service control in the game client in the game terminal, the game client in the game terminal may obtain a touch event stream for the service control, and then may transmit a cloud gaming data obtaining request carrying the touch event stream to the cloud server based on the data connection relationship. It is to be understood that, when the game user starts a cloud game (for example, the foregoing cloud game X), the cloud server allocates a cloud container (for example, the cloud container shown in FIG. 7) to the game client in advance.

2) In this case, the cloud server may deliver an instruction used for starting a game process (for example, the game process 70*a* shown in FIG. 7) to the cloud container shown in FIG. 7.

For example, the cloud server may determine, based on the client environment system (for example, Android system) in which the game client is located, the cloud container corresponding to the cloud gaming environment system matching the client environment system, to extract an attribute behavior event of a virtual object indicated by the service control from the cloud gaming data obtaining request, then may determine a process starting instruction associated with the attribute behavior event, and then may write the instruction (that is, process starting instruction) used for starting a game process (for example, the game process 70*a* shown in FIG. 7) to the cloud container.

3) In this case, the cloud container (that is, container configured to run the cloud gaming environment system) may start a game process (for example, the game process 70*a* shown in FIG. 7) based on the process starting instruction.

It may be understood that, in this embodiment of the present disclosure, before the game process 70*a* is started, the virtual object may be further controlled to perform the game attribute behavior in the cloud container based on an input time of the obtained touch event stream (that is, a touch operation corresponds to a touch time stamp). For example, in this embodiment of the present disclosure, the game attribute of the virtual object may be changed to perform the game attribute behavior. For example, a tribe name 1 to which the virtual object currently belongs may be changed into a tribe name 2, so that a vision display interface used for instructing to change the game attribute may be presented subsequently in a cloud gaming scene. In this embodiment of the present disclosure, a game attribute behavior of moving in a direction by the virtual object may be controlled in a game map at cloud. For example, the virtual object may be controlled in the game map to move rightward by a corresponding distance relative to a game position at the touch time stamp, so that a vision display interface obtained after rightward movement may be rendered in a cloud gaming scene subsequently.

4) The game process (for example, the game process 70*a*) requests a frame buffer from a frame buffer component.

For example, the frame buffer component may be the frame buffer component 70*b* shown in FIG. 7, and a service provided by the frame buffer component 70*b* may be the service 1 in the foregoing process management services shown in FIG. 6*a*. For example, the service 1 may be a SurfaceFlinger service used for providing a window management service. As shown in FIG. 7, the cloud server may transmit a frame buffer request instruction to the frame buffer component 70*b* shown in FIG. 7 through the game process 70*a*; and the frame buffer request instruction may be used for instructing the frame buffer component 70*b* to further transmit a buffer allocation instruction to the buffer allocator 70*c*.

5) The frame buffer component may further request a frame buffer from the buffer allocator.

The buffer allocator may be the buffer allocator 70*c* shown in FIG. 7.

6) The buffer allocator may invoke a graphics rendering drive through a graphics rendering node, and then may allocate a video memory in the physical rendering device through the graphics rendering drive, and therefore a video memory address corresponding to the video memory may be returned to an upper layer, where the upper layer refers to the game process in the cloud container.

It may be understood that, in the cloud container, when allocating the frame buffer to the game process 70*a* based on the buffer allocation instruction in 4), the buffer allocator (that is, the buffer allocator 70*c* shown in FIG. 7) may invoke the graphics rendering drive 70*e* through the graphics rendering node 70*d* having an association with the buffer allocator 70*c*, to allocate a video memory corresponding to the corresponding frame buffer in the physical rendering device having a hierarchical relationship with the graphics rendering drive 70*e*, where the video memory may be the video memory in the physical rendering device 70*f* shown in FIG. 7.

7) After determining the frame buffer based on the video memory address, the game process (for example, the game process 70*a*) may begin to invoke a graphics rendering library (for example, Mesa graphics library) to perform rendering.

8) In this case, after standardizing the graphics rendering instruction, the graphics rendering library (for example, Mesa graphics library) may deliver the standardized graphics rendering instruction to a kernel GPU drive (that is, the graphics rendering drive 70*e* shown in FIG. 7) through the graphics rendering node (for example, the graphics rendering node 70*d* shown in FIG. 7), and then may directly access the physical rendering device 70*f* (which refers to a physical GPU on hardware herein) shown in FIG. 7 based on the hierarchical relationship between the graphics rendering drive and the physical rendering device.

9) Perform rendering on the physical GPU (for example, the physical rendering device 70*f*).

10) A graphics composer (for example, the graphics composer 70*h* shown in FIG. 7) may further synthesize all video memories (that is, rendered game data in each video memory corresponding to the game process).

In addition, it may be understood that, in this embodiment of the present disclosure, the synthesized rendered game data may be further pushed together to FrameBuffer (that is, a frame buffer corresponding to the screen kernel) using the window management service provided by the graphics composer.

Step S104. Access a physical rendering device associated with the frame buffer based on the graphics rendering instruction, and perform intra-container rendering on game data corresponding to the game process through the physical rendering device, to obtain rendered game data corresponding to the game process.

Specifically, it may be understood that, after performing the foregoing step S103, the cloud server may obtain the graphics rendering instruction having the remote mapping relationship with the client environment system; further, the cloud server may standardize the graphics rendering instruction obtained in step S103 through the encapsulation component in the graphics rendering library (for example, the foregoing graphics rendering library 70*g* shown in FIG. 7), and transmit the standardized graphics rendering instruction to the graphics rendering drive (for example, the graphics rendering drive 70*e* in the embodiment corresponding to FIG. 7) through the graphics rendering node (for example, the graphics rendering node 70*d* in the embodiment corresponding to FIG. 7); further, the cloud server may access, based on the hierarchical relationship between the graphics rendering drive (for example, the foregoing graphics rendering drive 70*e* in the embodiment corresponding to FIG. 7) and the physical rendering device (for example, the foregoing physical rendering device 70*f* in the embodiment corresponding to FIG. 7), the physical rendering device (for example, the foregoing physical rendering device 70*f* in the embodiment corresponding to FIG. 7) associated with the frame buffer; and further, the cloud server may perform intra-container rendering on the game data corresponding to the game process through the graphics rendering function of the physical rendering device, and use rendered game data as the rendered game data corresponding to the game process.

Therefore, it can be seen that, in this embodiment of the present disclosure, the cloud server may reconstruct the entire system graphics stack, may directly access the physical rendering device associated with the frame buffer using the graphics rendering library in the cloud container, and then may perform intra-container rendering on the game data corresponding to the game process (for example, the foregoing game process 70*a* shown in FIG. 7) through the physical rendering device, to obtain the rendered game data corresponding to the game process.

It is to be understood that, when a plurality of game processes are started in the foregoing cloud container, for a specific implementation of allocating a frame buffer to each game process in the cloud container, reference may be made to the description of the specific process of allocating a frame buffer to the game process 70*a* shown in FIG. 7, and details do not continue to be described herein again.

Step S105. Generate a composited game picture according to the rendered game data.

Specifically, the composited game picture is used for being displayed on the game client. For the cloud server, when a plurality of game processes are started in the cloud container, each game process may be referred to as the foregoing associated process. This means that the game processes may specifically include K associated processes associated with the service control, where K is a positive integer. It may be understood that, in this case, the physical rendering device involved in this embodiment of the present disclosure specifically includes K video memories respectively corresponding to the K associated processes. Therefore, after the cloud server performs the foregoing step S104, the rendered game data may specifically include K pieces of rendered sub-data obtained after rendering game data of the K associated processes; and one video memory is configured to store one piece of rendered sub-data corresponding to one associated process. In this case, the cloud server may output the rendered sub-data stored in the K video memories to frame buffers to which video memory addresses of the corresponding video memories are mapped, to output data interfaces corresponding to the K pieces of rendered sub-data in each frame buffer, where a data interface is a window corresponding to an associated process; and further, the cloud server may synthesize the data interfaces (that is, a plurality of windows) corresponding to the K pieces of rendered sub-data through the graphics composer in the cloud container, and therefore may generate, based on the synthesized data interface of the K pieces of rendered sub-data, a composited game picture used for being displayed on the game client.

For ease of understanding, in this embodiment of the present disclosure, an example in which the game synthesis interface is a rendering synthesis interface 100*c* in the embodiment corresponding to FIG. 5 is taken, that is, the rendering synthesis interface 100*c* is obtained by superimposing windows respectively corresponding to a plurality of processes. For example, the foregoing rendering synthesis interface 100*c* may include a window corresponding to a text input region (that is, an operable region used for changing a tribe name shown in FIG. 5), and may further include a window corresponding to a text determining region (that is, an operable region in which a "complete" control shown in FIG. 5 is located), a window corresponding to a prompt text information region (that is, a region in which prompt text information "username is too short!" shown in FIG. 5 is located), and the like. Windows involved in the foregoing rendering synthesis interface 100*c* are not enumerated herein.

In this embodiment of the present disclosure, the computer device reconstructs the system graphics stack in the entire cloud container (for example, establishes a bridging channel between the game process and the graphics rendering library), so that game data corresponding to the entire game process may be internally rendered in the cloud container. That is, in this case, the computer device may directly access the physical renderer (for example, physical GPU) in the cloud container, and then may reduce the rendering time delay of the game in the game data rendering scenario. Moreover, when the computer device performs internal rendering in the cloud container, because it is not necessary to switch between different rendering manners, compatibility of the game may be enhanced. Therefore, when the computer device generates, according to the rendered game data, the composited game picture used for being displayed on the game client, the cloud game may be run at a relatively high frame rate in the cloud container, to enhance stability of the system.

Figure 8:
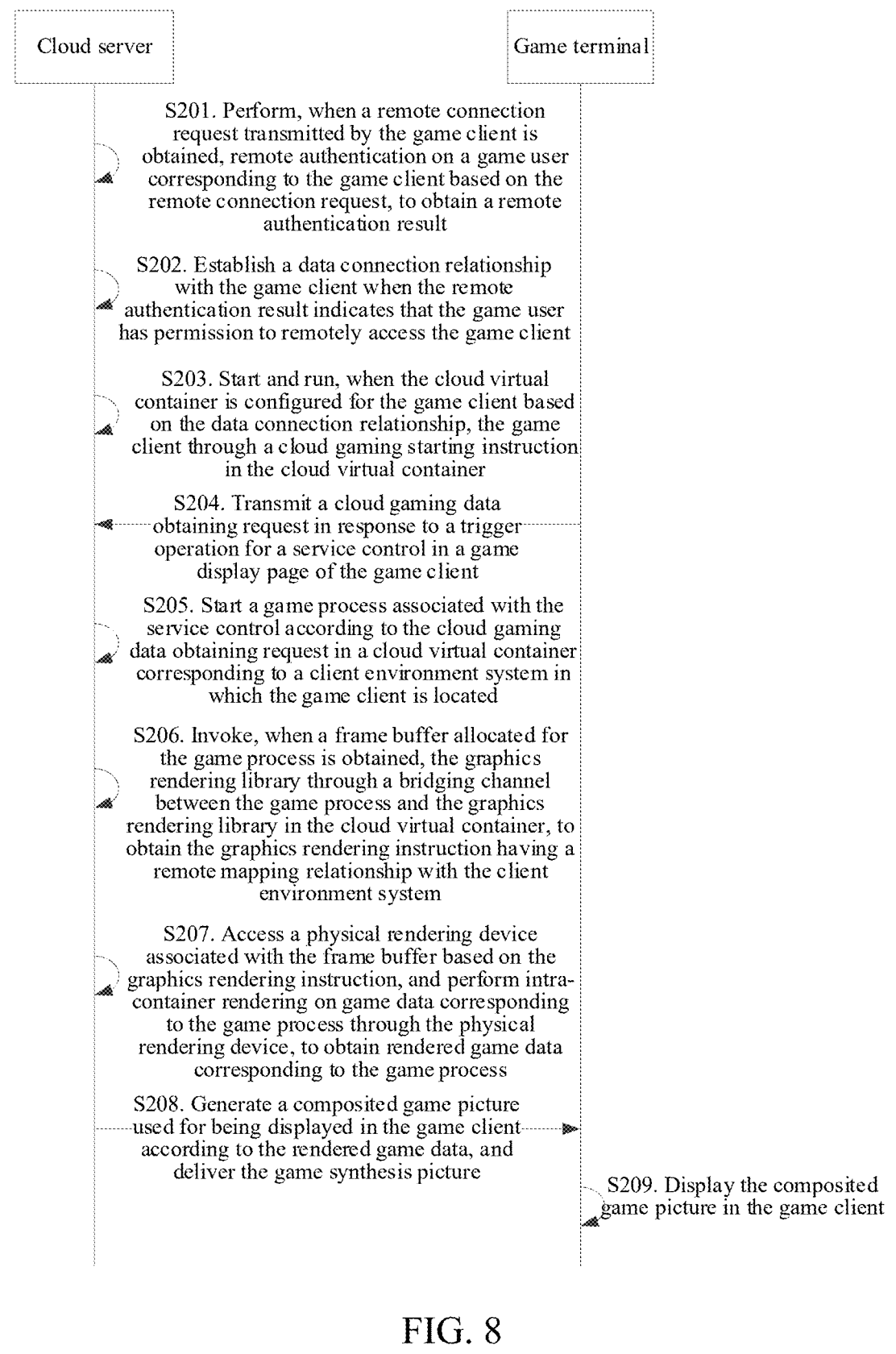

Further, FIG. 8 is a schematic flowchart of a data processing method according to an embodiment of the present disclosure. As shown in FIG. 8, the method may be performed by a computer device, the computer device may be a game terminal in which the foregoing game client runs, and the game terminal may be the game terminal 10*a* in the embodiment corresponding to FIG. 2; and alternatively, the computer device may be a back-end server corresponding to the game client, and the back-end server may be the cloud server 20*a* in the embodiment corresponding to FIG. 2. In other words, the method involved in this embodiment of the present disclosure may be performed by a game terminal corresponding to a game user, or may be performed by a cloud server, or may be performed jointly by a game terminal and a cloud server. For ease of understanding, in this embodiment, a description is made using an example in which the method is jointly performed by a game terminal and a cloud server, and method may include:

Step S201. The cloud server performs, when a remote connection request transmitted by the game client is obtained, remote authentication on a game user corresponding to the game client based on the remote connection request, to obtain a remote authentication result, where the remote connection request is obtained when the game user accesses the game client through game account information; and the remote connection request carries the client environment system in which the game client is located. This means that the remote connection request may be generated when the game user starts the game client. It may be understood that, when obtaining a remote connection request transmitted by a game terminal (for example, the foregoing terminal A1 in the embodiment corresponding to FIG. 4), the cloud server may extract game account information (for example, a mobile number, a social account, and other personal attribute information) of the game user carried in the remote connection request, authenticate the game user through the game account information, and continue to perform the following step S202 when the authentication succeeds; otherwise, reject the remote connection request currently initiated by the game user when the authentication fails. Based on this, in this embodiment of the present disclosure, by authenticating the identity of the game user, access control over access of the game user to the game client may be implemented, and then access security may be ensured. In addition, it may be understood that, when the authentication succeeds, in this embodiment of the present disclosure, the quantity of different terminal devices of the cloud server that are accessed by the game user through the same game account information may be further recorded, and when the quantity of accessed terminal devices does not exceed a quantity threshold, a composited game picture corresponding to rendered game data obtained by intra-container rendering is synchronously delivered to a plurality of terminals associated with the game user. For example, the terminal A1 and the terminal A2 in the embodiment corresponding to FIG. 4 may receive the composited game picture synchronously delivered by the cloud server. Based on this, by configuring the same cloud container for a plurality of terminals associated with the same user, the cloud server may autonomously configure the cloud container when a large quantity of different user terminals are concurrently accessed, and then may avoid waste of computing resources.

Step S202. The cloud server establishes a data connection relationship with the game client when the cloud server determines that the remote authentication result indicates that the game user has permission to remotely access the game client.

Step S203. The cloud server starts and runs, when the cloud container is configured for the game client based on the data connection relationship, the game client through a cloud gaming starting instruction in the cloud container.

Specifically, the cloud server may configure the cloud container for the game client based on the data connection relationship, and virtualize a cloud gaming environment system matching the client environment system in the cloud container; and further, the cloud server may start and run the game client in the cloud gaming environment system according to the cloud gaming starting instruction associated with the cloud container, and output a game display page corresponding to the game client to the game terminal corresponding to the game user.

For the specific implementation of step S201 to step S203, reference may be made to the description about the container 1 in the cloud server in the embodiment corresponding to FIG. 4, and details are not described herein again. It is to be understood that, in this embodiment of the present disclosure, by virtualizing the cloud gaming environment system matching the client environment system in the cloud container, a super runtime environment used for running a cloud game may be provided for the current game user at cloud, and then a cloud computing function of the cloud server may be fully used, so that processing efficiency of processing corresponding service logic (for example, service logic configured to control a game behavior of the virtual object at cloud) of the cloud game may be improved in the cloud container subsequently.

Step S204. The game terminal transmits a cloud gaming data obtaining request to a cloud server in response to a trigger operation for a game client.

Step S205. The cloud server starts a game process according to the cloud gaming data obtaining request in a cloud container corresponding to a client environment system in which the game client is located.

Step S206. The cloud server invokes, when a frame buffer allocated for the game process is obtained, the graphics rendering library through a bridging channel between the game process and the graphics rendering library in the cloud container, to obtain the graphics rendering instruction having a remote mapping relationship with the client environment system, where the cloud container may include a reconstructed system graphics stack; the system graphics stack is configured to instruct to directly access the physical rendering device having a graphics rendering function in the cloud container; and the system graphics stack includes: the game process, a frame buffer component, a buffer allocator, a graphics rendering node, a graphics rendering drive, and the physical rendering device; and therefore, it may be understood that, before performing step S207, the cloud server may further allocate a corresponding frame buffer to the game process in the cloud container. For example, the cloud server may transmit a frame buffer request instruction to the frame buffer component through the game process; the frame buffer request instruction may be used for instructing the frame buffer component to transmit a buffer allocation instruction to the buffer allocator; further, the cloud server may invoke, when the buffer allocator allocates a frame buffer for the game process based on the buffer allocation instruction, the graphics rendering drive through the graphics rendering node having an association with the buffer allocator, to allocate a video memory corresponding to the frame buffer in the physical rendering device having a hierarchical relationship with the graphics rendering drive; and further, the cloud server may return a video memory address corresponding to the video memory to the game process, where the video memory address may be used for pointing to the frame buffer corresponding to the game process.

Step S207. The cloud server accesses a physical rendering device associated with the frame buffer based on the graphics rendering instruction, and performs intra-container rendering on game data corresponding to the game process through the physical rendering device, to obtain rendered game data corresponding to the game process.

Step S208. The cloud server generates a composited game picture used for being displayed in the game client according to the rendered game data.

It may be understood that, when obtaining the composited game picture at cloud, the cloud server may encode the composited game picture at cloud (for example, may encode the composited game picture through an audio and video encoding technology, for example, an h264/h265 technology at cloud), and deliver an encoded bitstream to the game terminal. In this way, even if the game terminal currently used by the game user has neither a high-end processor nor a graphics card, corresponding video data (for example, composited game picture) and audio data may still be quickly outputted in the game terminal through an audio and video decoding capability of the game terminal, to improve an interface presentation effect of the local terminal.

For the specific implementation of step S204 to step S208, reference may be made to the description about step S101 to step S105 in the embodiment corresponding to FIG. 3, and details are not described herein again.

Step S209. The game terminal receives a composited game picture generated by the cloud server according to the rendered game data, and displays the composited game picture in the game client.

It may be understood that, after the game terminal receives the encoded bitstream delivered by the cloud server, the encoded bitstream may be further decoded using the audio and video decoding technology in the local terminal, to obtain the composited game picture through decoding, and then the composited game picture may be outputted and presented to the game user in the game client.

Figure 9:
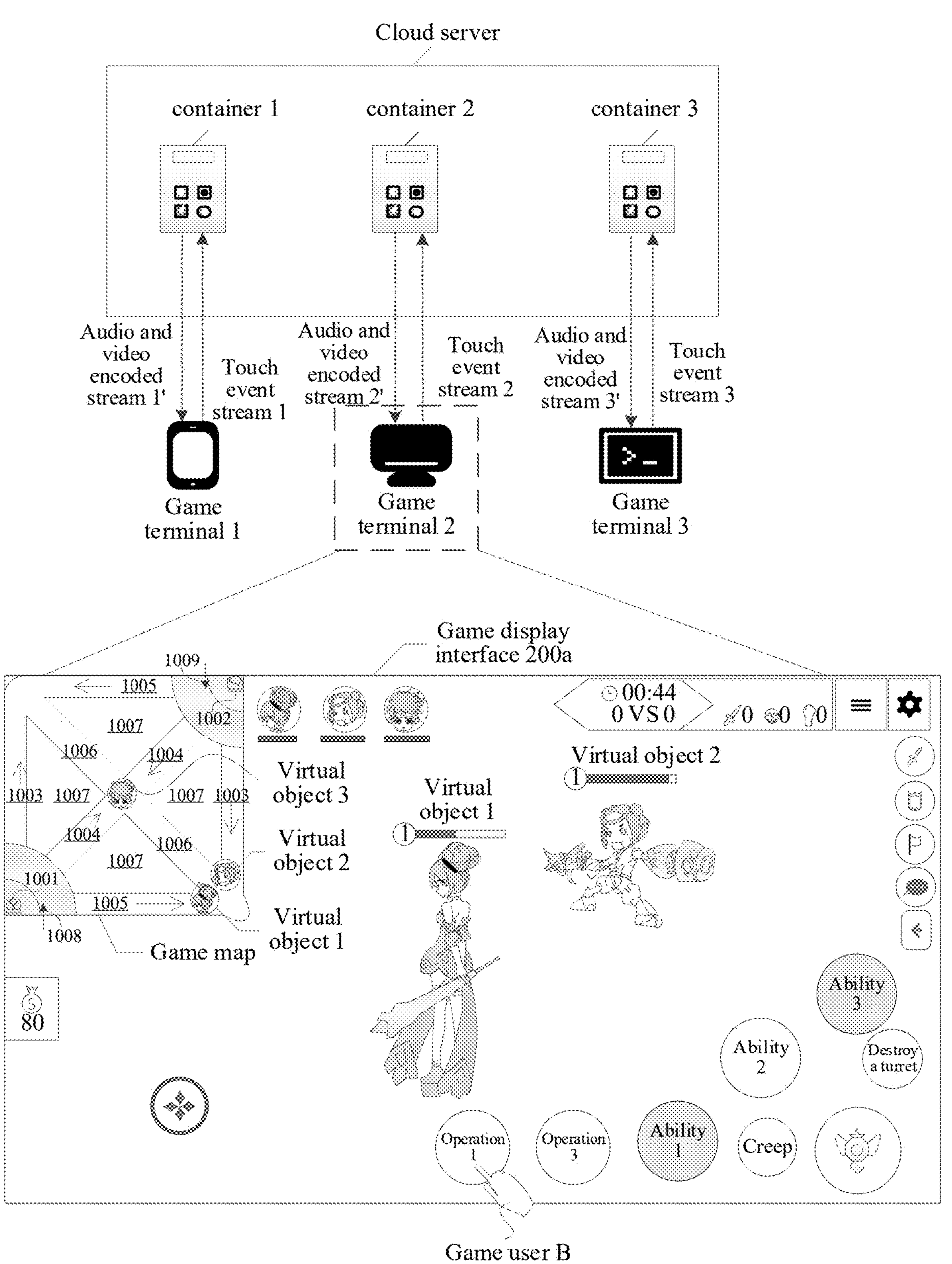
FIG. 9 is a schematic diagram of a scenario of obtaining a plurality of touch event streams according to an embodiment of the present disclosure.

It may be understood that, in this embodiment of the present disclosure, the cloud server may be configured to receive a touch event stream transmitted by one or more game users. For ease of understanding, further, FIG. 9 is a schematic diagram of a scenario of obtaining a plurality of touch event streams according to an embodiment of the present disclosure. A plurality of game terminals shown in FIG. 9 may specifically include a game terminal 1, a game terminal 2, and a game terminal 3 shown in FIG. 9. Touch event streams corresponding to the three game terminals may be a touch event stream 1, a touch event stream 2, and a touch event stream 3 in the embodiment corresponding to FIG. 9 respectively.

FIG. 9 gives a two-dimensional map of a competitive game (for example, MOBA game) in a virtual scene of a cloud game, and the two-dimensional map may be a game map shown in FIG. 9. In such a MOBA game, virtual objects may be substantially divided into two competitive camps, for example, a first camp and a second camp. As shown in FIG. 9, each camp may respectively include H (for example, 3) virtual objects, and a total of 2*H (for example, 6) virtual objects jointly perform a MOBA game battle. Virtual objects in the first camp may include a virtual object 1, a virtual object 2, and a virtual object 3 shown in FIG. 9 and located in the game map. Similarly, in the game map, 3 virtual objects (not shown in FIG. 9) in the second camp may specifically include a virtual object 4, a virtual object 5, and a virtual object 6.

As shown in FIG. 9, The game map in the virtual scene may be in the shape of a square, and the game map may be divided into the following several parts: bases (crystals) of the two camps at two ends of a diagonal line of the square respectively, that is, a first camp-party base 1001 and a second camp-party base 1002; the game map includes three attack routes connecting the first camp-party base 1001 to the second camp-party base 1002 and being an upper route 1003, an intermediate route 1004, and a lower route 1005 respectively; a public region, being a river 1006; and a wild zone 1007.

It may be understood that, in a cloud gaming scene, the virtual objects in the two camps are respectively born in respective base positions, and the three virtual objects in the same camp launch an attack on opponents in three attack directions respectively, to win a victory of the current round of game when destroying the base of the opponent camp. The 3 virtual objects in the first camp are born in the base 1001 shown in FIG. 9, the 3 virtual objects in the second camp are born in the base 1002 shown in FIG. 9, and the virtual objects in the two camps all observe the virtual scene with a perspective at which our base is located in a lower left corner of the observation perspective. That is, the virtual objects in the first camp may observe the virtual scene in the game map with a first perspective 1008, the virtual objects in the second camp may observe the virtual scene in the game map with a second perspective 1009, and all the virtual objects may launch an attack from attack directions (the upper route, the intermediate route, and the lower route) for respective perspectives. For example, a game user B shown in FIG. 9 may see, when a game duration is a duration T, a game display interface 200*a* presented by the game terminal 2 with the first perspective 1008.

It may be understood that, as shown in FIG. 9, when the game duration is the duration T, the virtual object 1 controlled by the game user B and a virtual object (for example, the virtual object 2 shown in FIG. 9) controlled by another game user (for example, a game user C) are in the same attack region (for example, are both located at an intersection of the lower route 1005 and the river 1006 of the game map). In this case, the game user B controlling the virtual object 1 may see the virtual object 2 shown in FIG. 9 (that is, the virtual object controlled by the game user C) in the game display interface 200*a* shown in FIG. 9. It may be understood that, because an attack region in which a virtual object controlled by another game user (for example, a game user D) is located is different from an attack region in which the virtual object 1 is located, the game user B temporarily cannot see the virtual object 3 controlled by the game user D in the game display interface 200*a*. However, the game user D may present the virtual object 3 controlled by the game user D in a game display interface of the game user D.

It is to be understood that, as shown in FIG. 9, when performing a trigger operation for a service control (for example, a control corresponding to an operation 1 shown in FIG. 9) in the game display interface 200*a*, the game user B may transmit a touch event stream shown in FIG. 9 to a cloud server having a data connection relationship with the game terminal 2, then may trigger a game process corresponding to a recall event in a container 2 of the cloud server, to implement intra-container rendering for game data corresponding to the recall event in the container 2, then may generate, after the rendering, a composited game picture associated with the recall event of the virtual object 1 and including a recall animation special effect, and then may encode the generated composited game picture in the container 2 shown in FIG. 9, to obtain an audio and video encoded stream 2' shown in FIG. 9. In this way, after the game terminal 2 decodes the audio and video encoded stream, the foregoing composited game picture including the recall animation special effect may be displayed in the game terminal 2.

Figure 10:
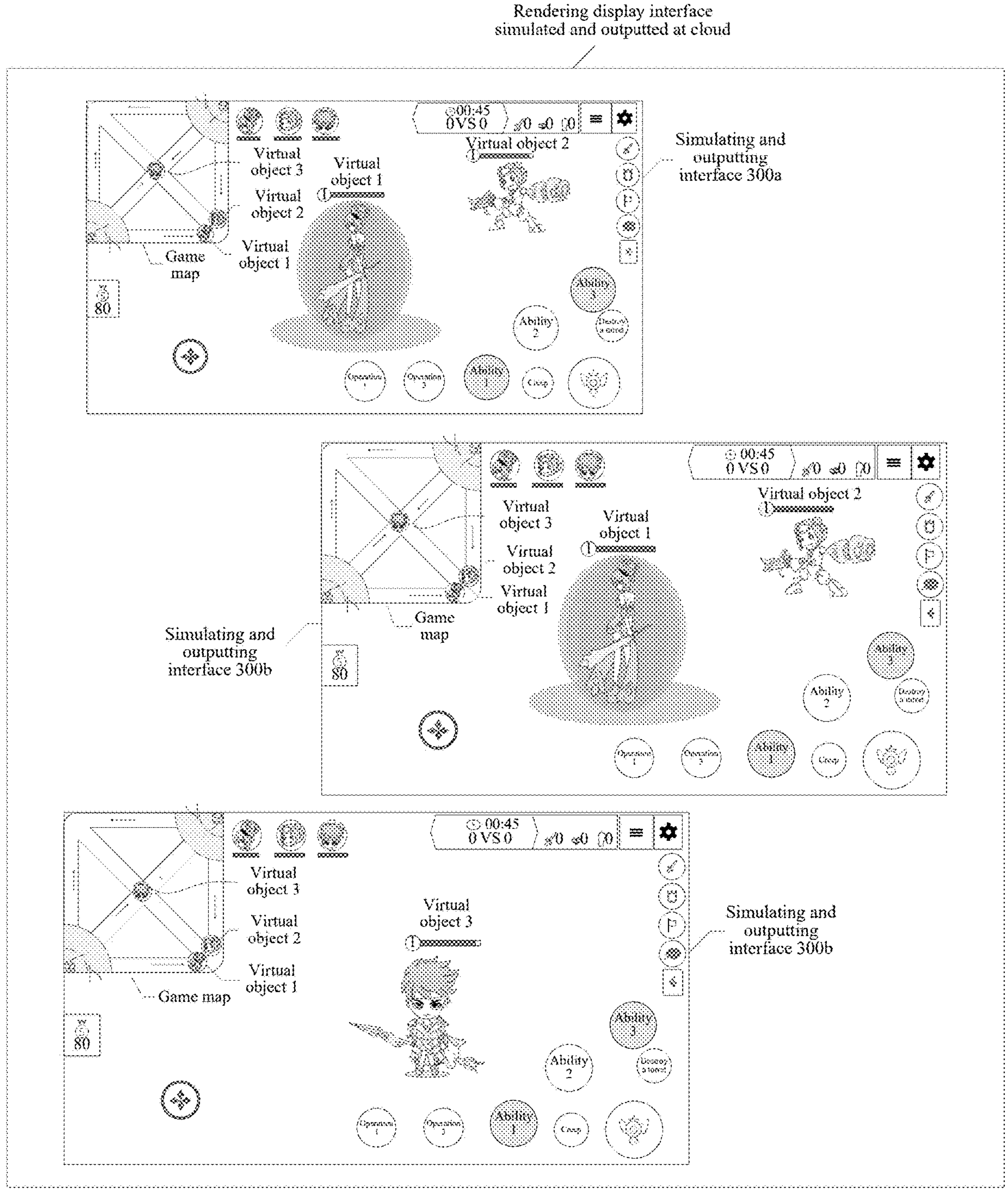
FIG. 10 is a schematic diagram of a scenario of simulating and outputting a rendering display interface at cloud according to an embodiment of the present disclosure.

It may be understood that, in this embodiment of the present disclosure, after the foregoing step S209 is performed, a game synthesis interface of a plurality of game users may be further simulated and outputted in the cloud server. For ease of understanding, further, FIG. 10 is a schematic diagram of a scenario of simulating and outputting a rendering display interface at cloud according to an embodiment of the present disclosure. A rendering display interface shown in FIG. 10 may specifically include composited game pictures respectively corresponding to the game user B, the game user C, and the game user D shown in FIG. 9. For example, the composited game picture corresponding to the game user B may be a simulating and outputting interface 300*a* shown in FIG. 10, and the simulating and outputting interface 300*a* may be a composited game picture including the recall animation special effect of the virtual object 1 shown in FIG. 10. It is to be understood that, when rendering is performed in the container 2 at cloud, the simulating and outputting interface 300*a* is determined according to screen parameter information of the game terminal 2 (for example, the resolution of the game terminal 2, for example, 1280×720) shown in FIG. 9. In another example, the composited game picture corresponding to the game user C may be a simulating and outputting interface 300*b* shown in FIG. 10, and the simulating and outputting interface 300*b* may be a composited game picture including an ability cast special effect of the virtual object 2 shown in FIG. 10. It is to be understood that, when rendering is performed in the container 1 at cloud, the simulating and outputting interface 300*b* may be determined according to screen parameter information of the game terminal 1 (for example, the resolution of the game terminal 1, for example, 1280×720) shown in FIG. 9. The rest may be deduced by analogy. In another example, the composited game picture corresponding to the game user D may be a simulating and outputting interface 300*c* shown in FIG. 10, and the simulating and outputting interface 300*c* may be a composited game picture including an ability cast special effect of the virtual object 3 shown in FIG. 10. It is to be understood that, when rendering is performed in the container 3 at cloud, the simulating and outputting interface 300*c* may be determined according to screen parameter information of the game terminal 3 (for example, the resolution of the game terminal 3, for example, 1280×720) shown in FIG. 9.

It may be understood that, in this embodiment of the present disclosure, in this embodiment of the present disclosure, Android containers (for example, the container 1, the container 2, and the container 3 shown in FIG. 9) as an underlying environment may provide a remote game runtime environment for the corresponding game terminals (that is, may provide a cloud gaming environment system for the corresponding game terminals, where the cloud gaming environment system may be a remote Android system). In this way, for the cloud server in which a plurality of containers concurrently run, after the entire graphics stack is reconstructed in the corresponding containers, for example, a graphics rendering interface inside the Android system is bridged to a Mesa graphics library (that is, the foregoing graphics rendering library), an encapsulation component having an instruction encapsulation function (for example, the foregoing libdrm component) may be positioned through the Mesa graphics library, and a graphics rendering operation indicated by a standardized graphics rendering instruction is further delivered to a graphics rendering drive (for example, the foregoing GPU graphics drive in the kernel mode) through the encapsulation component, to finally complete graphics rendering on specific hardware (for example, the foregoing physical rendering device).

It may be understood that, in this embodiment of the present disclosure, a corresponding graphics buffer may be allocated to a game process in the Android system running in the container through the foregoing buffer allocator (for example, a customized GBM_GRALLOC module for requesting a frame buffer for the corresponding game process). It may be understood that, in this embodiment of the present disclosure, the buffer allocator may further provide a complete Android gralloc interface, to manage the life cycle of the entire graphics buffer (that is, frame buffer), for example, destruct the frame buffer corresponding to the corresponding game process in the container when execution of the process ends. Additionally, in this embodiment of the present disclosure, by rewriting the graphics composer (that is, the foregoing hwcomposer device), a window management service (that is, SurfaceFlinger service) may be provided, to synthesize windows respectively corresponding to a plurality of processes through the SurfaceFlinger service of the Android system, to obtain a composited game picture on which windows of K associated processes are superimposed. In addition, it is to be understood that, in this embodiment of the present disclosure, when a container is started in the cloud server, a graphics rendering node (that is, the foregoing GPU node) may be designated into a specific container in advance. For details, reference may be made to the foregoing container configured for each game terminal shown in FIG. 9. In this way, in a multi-GPU environment, a container ID may be mapped to a specific GPU node, so that N containers running in the cloud server are evenly distributed on all GPU nodes, to complete load balancing of the rendering, and then stability of the system may be enhanced.

It is to be understood that, in this embodiment of the present disclosure, while delivering video data in a rendering synthesis picture to the game terminal, audio data associated with the video data in the rendering synthesis picture is further delivered together. That is, an audio stream and a video stream that are encoded may be collectively referred to as an encoded audio and video stream (that is, the foregoing video and audio stream), and is provided to the corresponding game terminal, so that the corresponding game terminal may perform decoding based on the received audio and video stream, and finally a game display page having the same content as that of the rendering synthesis picture at cloud may be obtained through decoding in the corresponding game terminal. Because rendering is performed in the container in this embodiment of the present disclosure, it is not necessary to perform format switching between different rendering manners, thereby effectively improving the compatibility of the system and reducing the rendering time delay.

Figure 11:
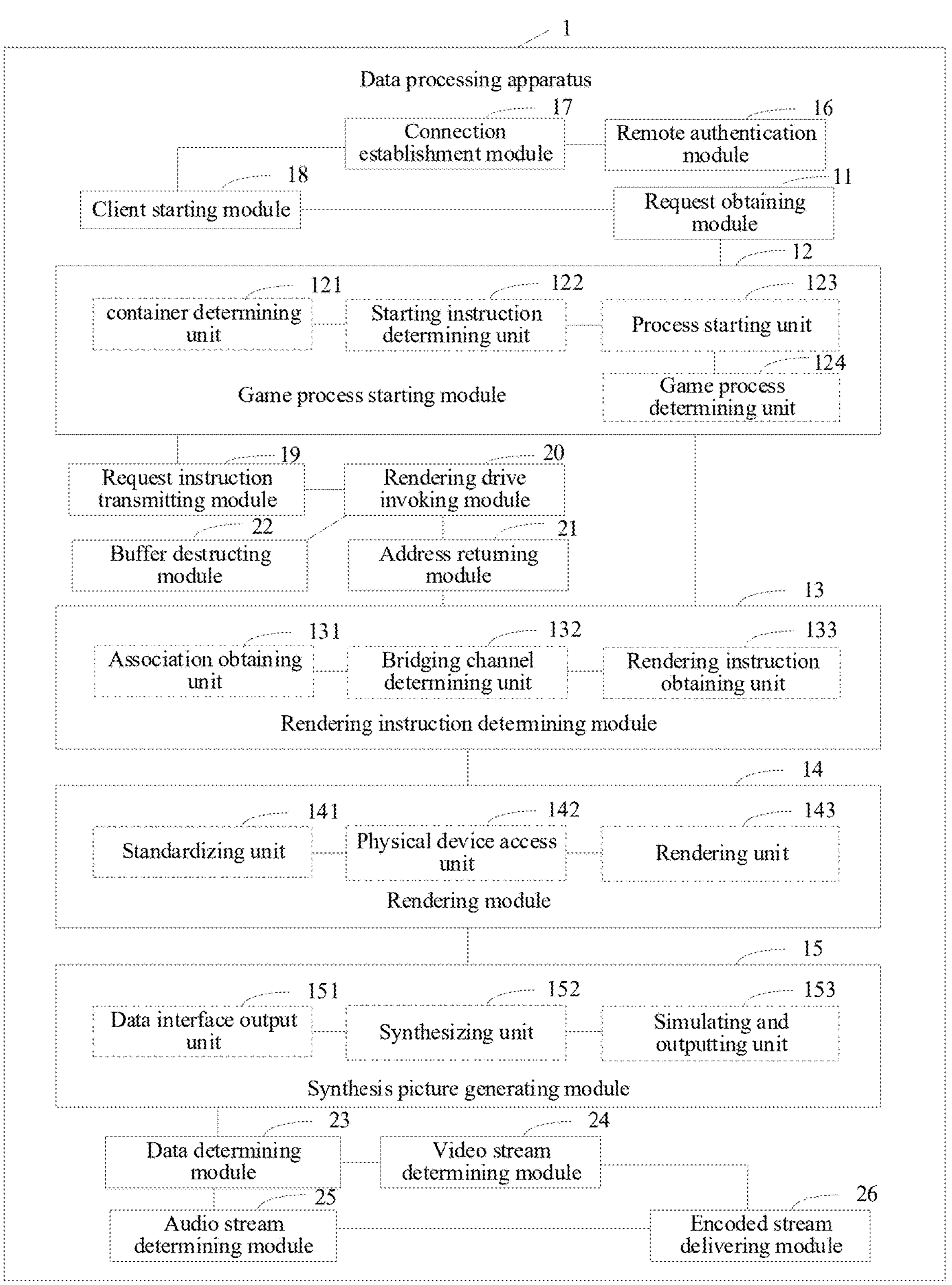
FIG. 11 is a schematic structural diagram of a data processing apparatus according to an embodiment of the present invention.

Further, FIG. 11 is a schematic structural diagram of a data processing apparatus according to an embodiment of the present invention. The data processing apparatus 1 is applicable to the foregoing cloud server, and the cloud server may be the foregoing cloud server 2000 in the embodiment corresponding to FIG. 1. Further, the data processing apparatus 1 may include: a request obtaining module 11, a game process starting module 12, a rendering instruction determining module 13, a rendering module 14, and a synthesis picture generating module 15; and the data processing apparatus 1 may further include: a remote authentication module 16, a connection establishment module 17, a client starting module 18, an request instruction transmitting module 19, a rendering drive invoking module 20, an address returning module 21, a buffer destructing module 22, a data determining module 23, a video stream determining module 24, an audio stream determining module 25, and an encoded stream delivering module 26;

the request obtaining module 11 is configured to obtain a cloud gaming data obtaining request transmitted by a game client;

the game process starting module 12 is configured to start a game process according to the cloud gaming data obtaining request in a cloud container corresponding to a client environment system in which the game client is located, where game display page corresponding to the game client includes a virtual object associated with the game user, and a service control in the game display page is used for manipulating a game attribute behavior of the virtual object in a cloud gaming environment system corresponding to the game client; and the game process starting module 12 includes: a container determining unit 121, a starting instruction determining unit 122, a process starting unit 123, and a game process determining unit 124;

the container determining unit 121 is configured to determine, based on the client environment system in which the game client is located, the cloud container corresponding to the cloud gaming environment system matching the client environment system;

the starting instruction determining unit 122 is configured to extract an attribute behavior event of the virtual object indicated by the service control from the cloud gaming data obtaining request, and determine a process starting instruction associated with the attribute behavior event;

the process starting unit 123 is configured to input the process starting instruction into the cloud container, control the virtual object to perform the game attribute behavior in the cloud container, and start K associated processes associated with the game attribute behavior, where K is a positive integer; and the game process determining unit 124 is configured to use the K associated processes as game processes associated with the service control.

For the specific implementation of the container determining unit 121, the starting instruction determining unit 122, the process starting unit 123, and the game process determining unit 124, reference may be made to the description about step S102 in the embodiment corresponding to FIG. 3, and details are not described herein again.

The rendering instruction determining module 13 is configured to invoke, when a frame buffer allocated for the game process is obtained, the graphics rendering library through a bridging channel between the game process and the graphics rendering library in the cloud container, to obtain the graphics rendering instruction having a remote mapping relationship with the client environment system, where the system graphics stack includes: the graphics rendering library having an association with the game process; and the rendering instruction determining module 13 includes: an association obtaining unit 131, a bridging channel determining unit 132, and a rendering instruction obtaining unit 133;

the association obtaining unit 131 is configured to obtain the association between the game process and the graphics rendering library when the frame buffer allocated for the game process is obtained;

the bridging channel determining unit 132 is configured to determine the bridging channel between the game process and the graphics rendering library in the cloud container based on the association; and the rendering instruction obtaining unit 133 is configured to invoke the graphics rendering library through the bridging channel, and obtain the graphics rendering instruction having the remote mapping relationship with the client environment system from the graphics rendering library.

For the specific implementation of the association obtaining unit 131, the bridging channel determining unit 132, and the rendering instruction obtaining unit 133, reference may be made to the description about step S103 in the embodiment corresponding to FIG. 3, and details are not described herein again.

The rendering module 14 is configured to access a physical rendering device associated with the frame buffer based on the graphics rendering instruction, and perform intra-container rendering on game data corresponding to the game process through the physical rendering device, to obtain rendered game data corresponding to the game process, where the graphics rendering library includes an encapsulation component having an instruction encapsulation function; and the rendering module 14 includes: a standardizing unit 141, a physical device access unit 142, and a rendering unit 143;

the standardizing unit 141 is configured to standardize the graphics rendering instruction through the encapsulation component, and transmit a standardized graphics rendering instruction to the graphics rendering drive through the graphics rendering node;

the physical device access unit 142 is configured to access the physical rendering device associated with the frame buffer based on the hierarchical relationship between the graphics rendering drive and the physical rendering device; and the rendering unit 143 is configured to perform intra-container rendering on the game data corresponding to the game process through the graphics rendering function of the physical rendering device, and use rendered game data as the rendered game data corresponding to the game process.

For the specific implementation of for the standardizing unit 141, the physical device access unit 142, and the rendering unit 143, reference may be made to the description about step S104 in the embodiment corresponding to FIG. 3, and details are not described herein again.

The synthesis picture generating module 15 is configured to generate a composited game picture used for being displayed in the game client according to the rendered game data.

The cloud gaming data obtaining request carries a service control triggered by a game user corresponding to the game client in a game display interface; the game process includes K associated processes associated with the service control; the physical rendering device includes K video memories respectively corresponding to the K associated processes; the rendered game data includes K pieces of rendered sub-data obtained after game data of the K associated processes is rendered; and one video memory is configured to store one piece of rendered sub-data corresponding to one associated process; and the synthesis picture generating module 15 includes: a data interface output unit 151, a synthesizing unit 152, and a simulating and outputting unit 153;

the data interface output unit 151 is configured to output the rendered sub-data stored in the K video memories to frame buffers to which video memory addresses of the corresponding video memories are mapped, and output data interfaces corresponding to the K pieces of rendered sub-data in each frame buffer; and the synthesizing unit 152 is configured to synthesize the data interfaces corresponding to the K pieces of rendered sub-data through a graphics composer in the cloud container, and generate, based on a synthesized data interface of the K pieces of rendered sub-data, the composited game picture used for being displayed in the game client.

The graphics composer is configured to provide a window management service for the game client; and the simulating and outputting unit 153 is configured to determine screen parameter information of a game terminal corresponding to the game client based on the window management service, and simulate and output the composited game picture in a kernel environment corresponding to the cloud container based on the screen parameter information.

For the specific implementation of the data interface output unit 151, the synthesizing unit 152, and the simulating and outputting unit 153, reference may be made to the description about step S105 the embodiment corresponding to FIG. 3, and details are not described herein again.

The remote authentication module 16 is configured to perform, when a remote connection request transmitted by the game client is obtained, remote authentication on a game user corresponding to the game client based on the remote connection request, to obtain a remote authentication result, where the remote connection request is obtained when the game user accesses the game client through game account information; and the remote connection request carries the client environment system in which the game client is located.

The connection establishment module 17 is configured to establish a data connection relationship with the game client when the remote authentication result indicates that the game user has permission to remotely access the game client; and The client starting module 18 is configured to start and run, when the cloud container is configured for the game client based on the data connection relationship, the game client through a cloud gaming starting instruction in the cloud container.

The cloud container includes a reconstructed system graphics stack; the system graphics stack is configured to instruct to directly access the physical rendering device having a graphics rendering function in the cloud container; and the system graphics stack includes: the game process, a frame buffer component, a buffer allocator, a graphics rendering node, a graphics rendering drive, and the physical rendering device; and

- the request instruction transmitting module 19 is configured to transmit a frame buffer request instruction to the frame buffer component through the game process, where the frame buffer request instruction is used for instructing the frame buffer component to transmit a buffer allocation instruction to the buffer allocator;
- the rendering drive invoking module 20 is configured to invoke, when the buffer allocator allocates a frame buffer for the game process based on the buffer allocation instruction, the graphics rendering drive through the graphics rendering node having an association with the buffer allocator, to allocate a video memory corresponding to the frame buffer in the physical rendering device having a hierarchical relationship with the graphics rendering drive; and
- the address returning module 21 is configured to return a video memory address corresponding to the video memory to the game process, where the video memory address is used for pointing to the frame buffer corresponding to the game process.

The buffer allocator can manage an entire life cycle of the frame buffer; and

- the buffer destructing module 22 is configured to destruct, when detecting that a process state of the game process is an end state, the frame buffer corresponding to the game process through the buffer allocator.

The data determining module 23 is configured to use the rendered game data in the composited game picture as to-be-encoded video data, and use audio data corresponding to the composited game picture as to-be-encoded audio data;

- the video stream determining module 24 is configured to encode the to-be-encoded video data based on an audio and video encoding rule in the cloud container, to obtain an encoded video stream;
- the audio stream determining module 25 is configured to encode the to-be-encoded audio data based on the audio and video encoding rule in the cloud container, to obtain an encoded audio stream; and
- the encoded stream delivering module 26 is configured to use the encoded video stream and the encoded audio stream as an encoded audio and video stream of a trigger event corresponding to the service control, and deliver the encoded audio and video stream to the game client, to cause the game client to decode the encoded audio and video stream.

For specific implementations of the request obtaining module 11, the game process starting module 12, the rendering instruction determining module 13, the rendering module 14, and the synthesis picture generating module 15, reference may be made to the description of step S101 to step S105 in the foregoing embodiment corresponding to FIG. 3. Details are not described herein again. For the specific implementation of the remote authentication module 16, the connection establishment module 17, and the client starting module 18, reference may be made to the description about the specific process of starting the game client in the embodiment corresponding to FIG. 3, and details are not described herein again. For the specific implementation of the request instruction transmitting module 19, the rendering drive invoking module 20, the address returning module 21, the buffer destructing module 22, the data determining module 23, the video stream determining module 24, the audio stream determining module 25, and the encoded stream delivering module 26, reference may be made to the description about the cloud server in the embodiment corresponding to FIGS. 8, and details are not described herein again. In addition, beneficial effects achieved by using the same method are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 12:
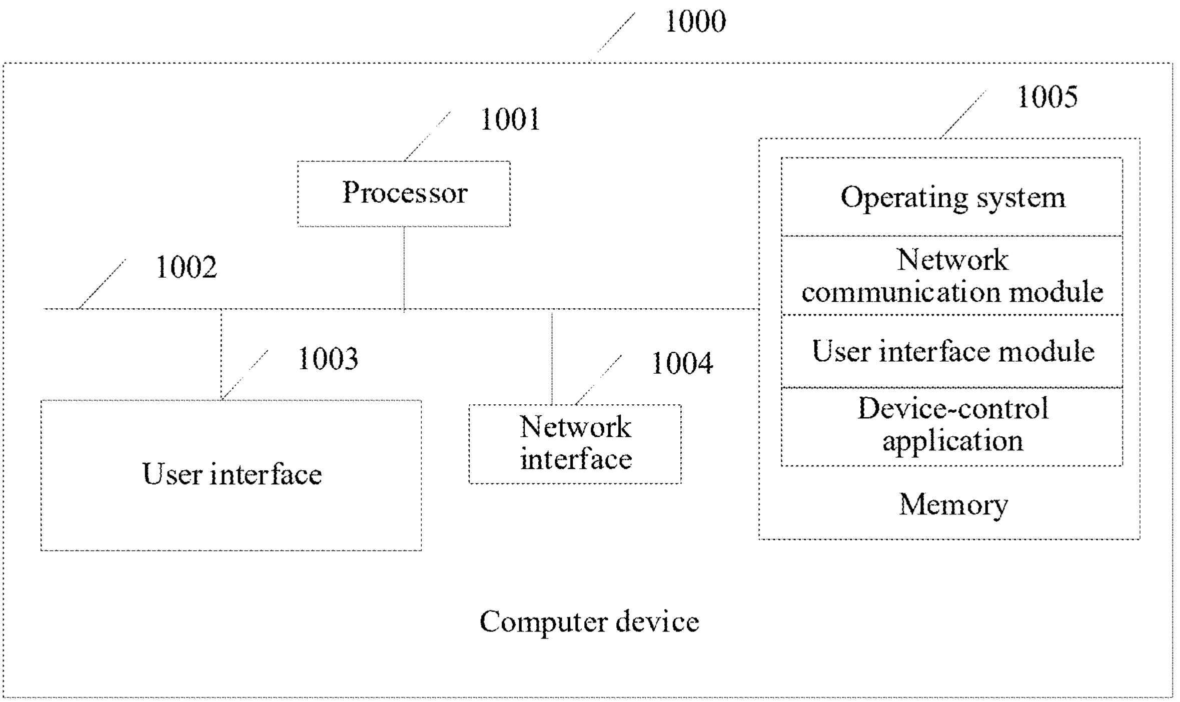
FIG. 12 is a schematic structural diagram of a computer device according to an embodiment of the present disclosure.

Further, FIG. 12 is a schematic structural diagram of a computer device according to an embodiment of the present disclosure. As shown in FIG. 12, The computer device 1000 may be a cloud server, and the cloud server may be the foregoing cloud server 2000 in the embodiment corresponding to FIG. 1. The computer device 1000 may include: a processor 1001, a network interface 1004, and a memory 1005. Moreover, the computer device 1000 may further include: a user interface 1003 and at least one communication bus 1002. The communication bus 1002 is configured to implement connection and communication between these components. The user interface 1003 may further include a standard wired interface and wireless interface. The network interface 1004 may include a standard wired interface and a standard wireless interface (for example, a Wi-Fi interface). The memory 1004 may be a high-speed RAM, or may be a non-transitory memory, for example, at least one magnetic disk memory. The memory 1005 may alternatively be at least one storage apparatus located away from the processor 1001. As shown in FIG. 12, the memory 1005 used as a computer storage medium may include an OS, a network communication module, a user interface module, and a device control application.

The network interface 1004 in the computer device 1000 may be further network-connected to the foregoing game terminal 10*a* in the embodiment corresponding to FIG. 2. In the computer device 1000 shown in FIG. 12, the network interface 1004 may provide a network communication function; the user interface 1003 is mainly configured to provide an input interface for a user, and the processor 1001 may be configured invoke the device-control application stored in the memory 1005, to implement:

obtaining a cloud gaming data obtaining request transmitted by a game client;

starting a game process according to the cloud gaming data obtaining request in a cloud container corresponding to a client environment system in which the game client is located;

invoking, when a frame buffer allocated for the game process is obtained, the graphics rendering library through a bridging channel between the game process and the graphics rendering library in the cloud container, to obtain the graphics rendering instruction having a remote mapping relationship with the client environment system;

accessing a physical rendering device associated with the frame buffer based on the graphics rendering instruction, and performing intra-container rendering on game data corresponding to the game process through the physical rendering device, to obtain rendered game data corresponding to the game process; and generating a composited game picture used for being displayed in the game client according to the rendered game data.

It is to be understood that, the computer device 1000 described in this embodiment of the present disclosure can perform the data processing method in the foregoing embodiment corresponding to FIG. 3 or FIG. 8, and can also perform functions of the data processing apparatus 1 in the foregoing embodiment corresponding to FIG. 11. Details are not repeated herein. In addition, beneficial effects achieved by using the same method are not described herein again.

In addition, an embodiment of the present disclosure further provides a computer storage medium. The computer storage medium stores computer programs executed by the foregoing data processing apparatus 1. The computer program includes program instructions. When executing the program instructions, a processor can perform the data processing method in the foregoing embodiment corresponding to FIG. 3 or FIG. 8. Therefore, details are not repeated herein. In addition, beneficial effects achieved by using the same method are not described herein again. For technical details that are not disclosed in the embodiment of the computer storage medium of the present disclosure, reference is made to the descriptions of the method embodiments of the present disclosure. In an example, the program instruction may be deployed to be executed on a computing device, or deployed to be executed on a plurality of computing devices at the same location, or deployed to be executed on a plurality of computing devices that are distributed in a plurality of locations and interconnected through a communication network. The plurality of computing devices that are distributed in the plurality of locations and interconnected through the communication network may form a blockchain system.

According to an aspect of the present disclosure, a computer program product or a computer program is provided, including computer instructions, the computer instructions being stored in a computer-readable storage medium. A processor of a computer device reads the computer instructions from the computer-readable storage medium, and executes the computer instructions, to cause the computer device to perform the data processing method in the foregoing embodiment corresponding to FIG. 3 or FIG. 8. Details are not described herein. In addition, beneficial effects achieved by using the same method are not described herein again.

Figure 13:
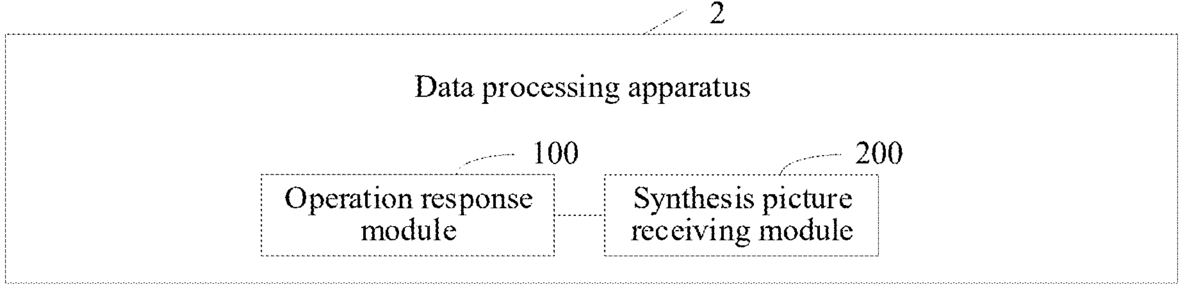
FIG. 13 is a schematic structural diagram of a data processing apparatus according to an embodiment of the present invention.

Further, FIG. 13 is a schematic structural diagram of a data processing apparatus according to an embodiment of the present invention. The data processing apparatus 2 may include: an operation response module 100 and a synthesis picture receiving module 200;

the operation response module 100 is configured to: transmit a cloud gaming data obtaining request to a cloud server in response to a trigger operation for a game client, the cloud gaming data obtaining request being used for instructing the cloud server to start a game process; and invoke, through a bridging channel between the game process and a graphics rendering library in a cloud container when a frame buffer allocated for the game process is obtained, a graphics rendering instruction in the graphics rendering library to access a physical rendering device associated with the frame buffer, and perform intra-container rendering on game data corresponding to the game process through the physical rendering device, to obtain rendered game data corresponding to the game process; and the synthesis picture receiving module 200 is configured to receive a composited game picture generated by the cloud server according to the rendered game data, and display the composited game picture in the game client.

For specific implementations of the operation response module 100 and the synthesis picture receiving module 200, reference may be made to the description of the game terminal in the foregoing embodiment corresponding to FIG. 8. Details are not described herein again.

Figure 14:
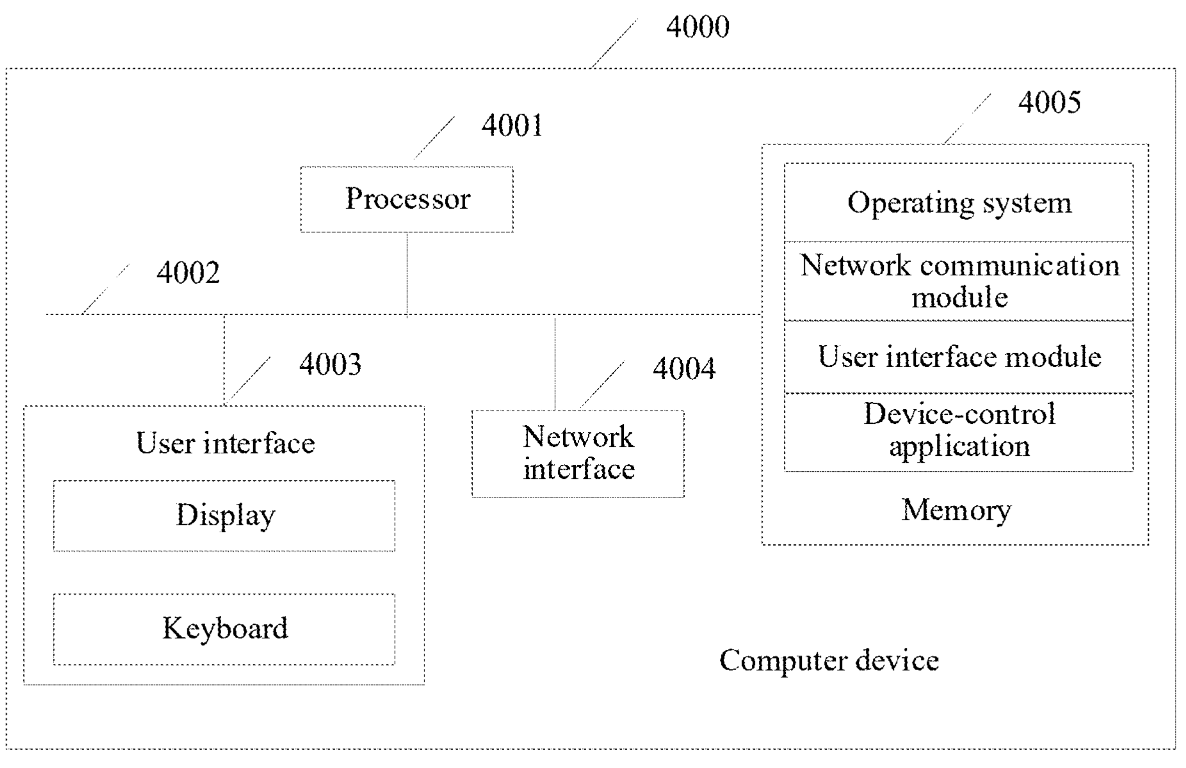
FIG. 14 is a schematic structural diagram of a computer device according to an embodiment of the present disclosure.

Further, FIG. 14 is a schematic structural diagram of a computer device according to an embodiment of the present disclosure. As shown in FIG. 14, the computer device 4000 may be a game terminal, and the game terminal may be the user terminal 3000*a* in the foregoing embodiment corresponding to FIG. 1. The computer device 4000 may include: a processor 4001, a network interface 4004, and a memory 4005. Moreover, the computer device 4000 may further include: a user interface 4003 and at least one communication bus 4002. The communication bus 4002 is configured to implement connection and communication between these components. The user interface 4003 may include a display and a keyboard. The network interface 4004 may include a standard wired interface and a standard wireless interface (for example, a Wi-Fi interface). The memory 4005 may be a high-speed RAM, or may be a non-transitory memory, for example, at least one magnetic disk memory. The memory 4005 may alternatively be at least one storage apparatus located away from the processor 4001. As shown in FIG. 14, the memory 4005 used as a computer storage medium may include an OS, a network communication module, a user interface module, and a device control application.

The network interface 4004 in the computer device 4000 may further provide a network communication function. In the computer device 4000 shown in FIG. 14, the network interface 4004 may provide a network communication function; the user interface 4003 is mainly configured to provide an input interface for a user, and the processor 4001 may be configured invoke the device-control application stored in the memory 4005, to implement:

transmitting a cloud gaming data obtaining request to a cloud server in response to a trigger operation for a game client, the cloud gaming data obtaining request being used for instructing the cloud server to start a game process; and invoking, through a bridging channel between the game process and a graphics rendering library in a cloud container when a frame buffer allocated for the game process is obtained, a graphics rendering instruction in the graphics rendering library to access a physical rendering device associated with the frame buffer, and performing intra-container rendering on game data corresponding to the game process through the physical rendering device, to obtain rendered game data corresponding to the game process; and receiving a composited game picture generated by the cloud server according to the rendered game data, and displaying the composited game picture in the game client.

It may be understood that, an embodiment of the present disclosure also provides a computer program product or computer program, including a computer instruction stored in a computer-readable storage medium. A processor of a computer device reads the computer instructions from the computer-readable storage medium, and executes the computer instructions, to cause the computer device to perform the data processing method in the foregoing embodiment corresponding to FIG. 3 or FIG. 8. Therefore, details are not repeated herein. In addition, beneficial effects achieved by using the same method are not described herein again. For technical details that are not disclosed in the embodiment of the computer storage medium of the present disclosure, reference is made to the descriptions of the method embodiments of the present disclosure.

Figure 15:
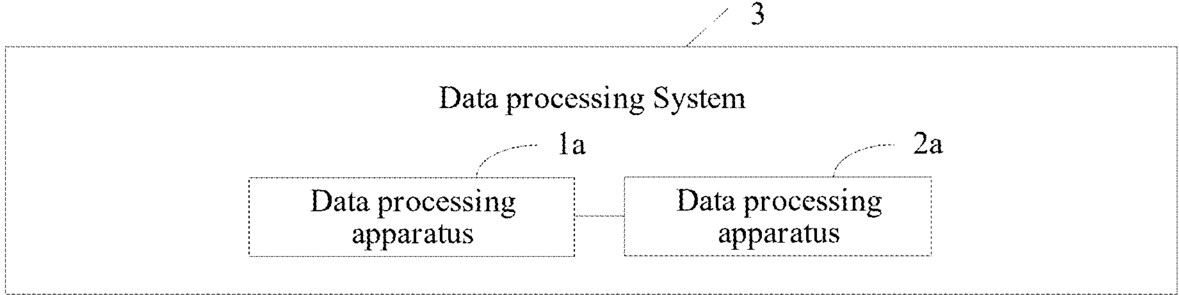
FIG. 15 is a schematic structural diagram of a data processing system according to an embodiment of the present disclosure.

Further, FIG. 15 is a schematic structural diagram of a data processing system according to an embodiment of the present disclosure. The data processing system 3 may include a data processing apparatus 1*a* and a data processing apparatus 2*a*. The data processing apparatus 1*a* may be the foregoing data processing apparatus 1 in the embodiment corresponding to FIG. 11. It may be understood that, the data processing apparatus 1*a* may be integrated in the foregoing cloud server 20*a* in the embodiment corresponding to FIG. 2. Therefore, details are not repeated herein. The data processing apparatus 2*a* may be the foregoing data processing apparatus 2 in the embodiment corresponding to FIG. 13. It may be understood that, the data processing apparatus 2*a* may be integrated in the foregoing game terminal 10*a* in the embodiment corresponding to FIG. 2. Therefore, details are not repeated herein. In addition, beneficial effects achieved by using the same method are not described herein again. For technical details that are not disclosed in the embodiment of the video data processing system of the present disclosure, reference is made to the descriptions of the method embodiments of the present disclosure.

In this embodiment of the present disclosure, when obtaining the cloud gaming data obtaining request transmitted by the game client, the computer device may start the game process according to the cloud gaming data obtaining request in the cloud container corresponding to the client environment system in which the game client is located (for example, the Android system in which the game client is located). It may be understood that, the cloud gaming data obtaining request is generated by the game client in response to the trigger operation of the game user. This means that in a cloud gaming scene, the game user (which may also be referred to as a player) may perform a trigger operation for a service control in the current game display interface (for example, an operation control configured to control the virtual object in the game display interface to move) in the game terminal in which the game client runs, so that the game client running in the game terminal may initiate the cloud gaming data obtaining request to the computer device. In this case, when obtaining the frame buffer allocated to the game process, the computer device may invoke, through a bridging channel between the game process and the graphics rendering library in the cloud container, the graphics rendering library to obtain the graphics rendering instruction having the remote mapping relationship with the client environment system, to access the physical rendering device associated with the frame buffer based on the graphics rendering instruction, and then may perform intra-container rendering on game data corresponding to the game process through the physical rendering device, thereby obtaining rendered game data corresponding to the currently started game process. Therefore, it can be seen that, in this embodiment of the present disclosure, the computer device reconstructs the system graphics stack in the entire cloud container (for example, establishes a bridging channel between the game process and the graphics rendering library), so that game data corresponding to the entire game process may be internally rendered in the cloud container. That is, in this case, the computer device may directly access the physical renderer (for example, physical GPU) in the cloud container, and then may reduce the rendering time delay of the game in the game data rendering scenario. Moreover, when the computer device performs internal rendering in the cloud container, because it is not necessary to switch between different rendering manners, compatibility of the game may be enhanced. Therefore, when the computer device generates, according to the rendered game data, the composited game picture used for being displayed on the game client, the cloud game may be run at a relatively high frame rate in the cloud container, to enhance stability of the system.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The storage medium may be a magnetic disk, an optical disc, a read-only memory (ROM), a random access memory (RAM), or the like.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A data processing method, comprising:

receiving a request transmitted by a game client to obtain cloud gaming data;

starting a game process according to the request to obtain the cloud gaming data in a cloud container corresponding to the game client, wherein the cloud container comprises a reconstructed system graphics stack comprising: the game process, a buffer allocator, a graphics rendering node, a graphics rendering drive, and a physical rendering device;

allocating, in the cloud container, a frame buffer for the game process;

invoking, in response to the frame buffer being allocated, a graphics rendering library in the cloud container to obtain a graphics rendering instruction;

invoking, when the buffer allocator allocates the frame buffer for the game process based on a buffer allocation instruction, the graphics rendering drive through the graphics rendering node having an association with the buffer allocator, to allocate a video memory corresponding to the frame buffer in the physical rendering device having a hierarchical relationship with the graphics rendering drive;

accessing the physical rendering device associated with the frame buffer based on the graphics rendering instruction, and performing intra-container rendering on game data corresponding to the game process through the physical rendering device, to obtain rendered game data corresponding to the game process; and generating a composited game picture according to the rendered game data.

2. The method according to claim 1, wherein the cloud container corresponds to a client environment system in which the game client is located, and the composited game picture is used for being displayed in the game client; and the method further comprises:

invoking the graphics rendering library through a bridging channel between the game process and the graphics rendering library in the cloud container, to obtain the graphics rendering instruction having a remote mapping relationship with the client environment system.

3. The method according to claim 2, wherein before the receiving the request transmitted by the game client to obtain the cloud gaming data, the method further comprises:

performing, when a remote connection request transmitted by the game client is obtained, remote authentication on a game user corresponding to the game client based on the remote connection request, to obtain a remote authentication result, wherein the remote connection request is obtained when the game user accesses the game client through game account information; and the remote connection request carries the client environment system in which the game client is located;

establishing a data connection relationship with the game client when the remote authentication result indicates that the game user has permission to remotely access the game client; and starting and running, when the cloud container is configured for the game client based on the data connection relationship, the game client through a cloud gaming starting instruction in the cloud container.

4. The method according to claim 3, wherein game display page corresponding to the game client comprises a virtual object associated with the game user, and a service control in the game display page is used for manipulating a game attribute behavior of the virtual object in a cloud gaming environment system corresponding to the game client; and the starting the game process according to the request to obtain the cloud gaming data in the cloud container corresponding to the client environment system in which the game client is located comprises:

determining, based on the client environment system in which the game client is located, the cloud container corresponding to the cloud gaming environment system matching the client environment system;

extracting an attribute behavior event of the virtual object indicated by the service control from the request to obtain the cloud gaming data, and determining a process starting instruction associated with the attribute behavior event;

inputting the process starting instruction into the cloud container, controlling the virtual object to perform the game attribute behavior in the cloud container, and starting K associated processes associated with the game attribute behavior, wherein K is a positive integer; and using the K associated processes as game processes associated with the service control.

5. The method according to claim 1, wherein; the reconstructed system graphics stack is configured to instruct to directly access the physical rendering device having a graphics rendering function in the cloud container; and the reconstructed system graphics stack further comprises: a frame buffer component; and the method further comprises:

transmitting a frame buffer request instruction to the frame buffer component through the game process, wherein the frame buffer request instruction is used for instructing the frame buffer component to transmit the buffer allocation instruction to the buffer allocator; and returning a video memory address corresponding to the video memory to the game process, wherein the video memory address is used for pointing to the frame buffer corresponding to the game process.

6. The method according to claim 5, wherein the reconstructed system graphics stack comprises: the graphics rendering library having an association with the game process; and the invoking, when a frame buffer allocated for the game process is obtained, the graphics rendering library through a bridging channel between the game process and the graphics rendering library in the cloud container, to obtain the graphics rendering instruction having a remote mapping relationship with the client environment system comprises:

obtaining the association between the game process and the graphics rendering library when the frame buffer allocated for the game process is obtained;

determining the bridging channel between the game process and the graphics rendering library in the cloud container based on the association; and invoking the graphics rendering library through the bridging channel, and obtaining the graphics rendering instruction having the remote mapping relationship with the client environment system from the graphics rendering library.

7. The method according to claim 6, wherein the graphics rendering library comprises an encapsulation component having an instruction encapsulation function; and the accessing the physical rendering device associated with the frame buffer based on the graphics rendering instruction, and performing the intra-container rendering on the game data corresponding to the game process through the physical rendering device, to obtain the rendered game data corresponding to the game process comprises:

standardizing the graphics rendering instruction through the encapsulation component, and transmitting a standardized graphics rendering instruction to the graphics rendering drive through the graphics rendering node;

accessing the physical rendering device associated with the frame buffer based on the hierarchical relationship between the graphics rendering drive and the physical rendering device; and performing intra-container rendering on the game data corresponding to the game process through the graphics rendering function of the physical rendering device, and using rendered game data as the rendered game data corresponding to the game process.

8. The method according to claim 5, wherein the buffer allocator manages an entire life cycle of the frame buffer; and the method further comprises:

destructing, when detecting that a process state of the game process is an end state, the frame buffer corresponding to the game process through the buffer allocator.

9. The method according to claim 1, wherein the request to obtain the cloud gaming data carries a service control triggered by a game user corresponding to the game client in a game display interface; the game process comprises K associated processes associated with the service control; the physical rendering device comprises K video memories respectively corresponding to the K associated processes; the rendered game data comprises K pieces of rendered sub-data obtained after game data of the K associated processes is rendered; and one video memory is configured to store one piece of rendered sub-data corresponding to one associated process; and the generating the composited game picture used for being displayed in the game client according to the rendered game data comprises:

outputting the rendered sub-data stored in the K video memories to frame buffers to which video memory addresses of the corresponding video memories are mapped, and outputting data interfaces corresponding to the K pieces of rendered sub-data in each frame buffer; and synthesizing the data interfaces corresponding to the K pieces of rendered sub-data through a graphics composer in the cloud container, and generating, based on a synthesized data interface of the K pieces of rendered sub-data, the composited game picture used for being displayed in the game client.

10. The method according to claim 9, wherein the graphics composer is configured to provide a window management service for the game client; and the method further comprises:

determining screen parameter information of a game terminal corresponding to the game client based on the window management service, and simulating and outputting the composited game picture in a kernel environment corresponding to the cloud container based on the screen parameter information.

11. The method according to claim 9, further comprising:

using the rendered game data in the composited game picture as video data to be encoded, and using audio data corresponding to the composited game picture as audio data to be encoded;

encoding the video data based on an audio and video encoding rule in the cloud container, to obtain an encoded video stream;

encoding the audio data based on the audio and video encoding rule in the cloud container, to obtain an encoded audio stream; and using the encoded video stream and the encoded audio stream as an encoded audio and video stream of a trigger event corresponding to the service control, and delivering the encoded audio and video stream to the game client, to cause the game client to decode the encoded audio and video stream.

12. A data processing apparatus, comprising: a processor and a memory, the processor being connected to the memory, the memory being configured to store a computer program, and the processor being configured to invoke the computer program to:

receive a request transmitted by a game client to obtain cloud gaming data;

start a game process according to the request to obtain the cloud gaming data in a cloud container corresponding to the game client, wherein the cloud container comprises a reconstructed system graphics stack comprising: the game process, a buffer allocator, a graphics rendering node, a graphics rendering drive, and a physical rendering device;

allocate, in the cloud container, a frame buffer for the game process;

invoke, in response to the frame buffer being allocated, a graphics rendering library in the cloud container to obtain a graphics rendering instruction;

invoke, when the buffer allocator allocates the frame buffer for the game process based on a buffer allocation instruction, the graphics rendering drive through the graphics rendering node having an association with the buffer allocator, to allocate a video memory corresponding to the frame buffer in the physical rendering device having a hierarchical relationship with the graphics rendering drive;

access the physical rendering device associated with the frame buffer based on the graphics rendering instruction in the graphics rendering library, and perform intra-container rendering on game data corresponding to the game process through the physical rendering device, to obtain rendered game data corresponding to the game process; and generate a composited game picture according to the rendered game data.

13. The apparatus according to claim 12, wherein the cloud container corresponds to a client environment system in which the game client is located, and the composited game picture is used for being displayed in the game client; and the processor is further configured to invoke the graphics rendering library through a bridging channel between the game process and the graphics rendering library in the cloud container, to obtain the graphics rendering instruction having a remote mapping relationship with the client environment system.

14. The apparatus according to claim 13, wherein the processor is further configured to:

perform, when a remote connection request transmitted by the game client is obtained, remote authentication on a game user corresponding to the game client based on the remote connection request, to obtain a remote authentication result, wherein the remote connection request is obtained when the game user accesses the game client through game account information; and the remote connection request carries the client environment system in which the game client is located;

establish a data connection relationship with the game client when the remote authentication result indicates that the game user has permission to remotely access the game client; and start and run, when the cloud container is configured for the game client based on the data connection relationship, the game client through a cloud gaming starting instruction in the cloud container.

15. The apparatus according to claim 14, wherein game display page corresponding to the game client comprises a virtual object associated with the game user, and a service control in the game display page is used for manipulating a game attribute behavior of the virtual object in a cloud gaming environment system corresponding to the game client; and the processor is further configured to:

determine, based on the client environment system in which the game client is located, the cloud container corresponding to the cloud gaming environment system matching the client environment system;

extract an attribute behavior event of the virtual object indicated by the service control from the request to obtain the cloud gaming data, and determine a process starting instruction associated with the attribute behavior event;

input the process starting instruction into the cloud container, control the virtual object to perform the game attribute behavior in the cloud container, and start K associated processes associated with the game attribute behavior, wherein K is a positive integer; and use the K associated processes as game processes associated with the service control.

16. The apparatus according to claim 12, wherein the reconstructed system graphics stack is configured to instruct to directly access the physical rendering device having a graphics rendering function in the cloud container; and the reconstructed system graphics stack further comprises: a frame buffer component; and the processor is further configured to:

transmit a frame buffer request instruction to the frame buffer component through the game process, wherein the frame buffer request instruction is used for instructing the frame buffer component to transmit the buffer allocation instruction to the buffer allocator;

and return a video memory address corresponding to the video memory to the game process, wherein the video memory address is used for pointing to the frame buffer corresponding to the game process.

17. The apparatus according to claim 16, wherein the reconstructed system graphics stack comprises: the graphics rendering library having an association with the game process; and the processor is further configured to:

obtain the association between the game process and the graphics rendering library when the frame buffer allocated for the game process is obtained;

determine the bridging channel between the game process and the graphics rendering library in the cloud container based on the association; and invoke the graphics rendering library through the bridging channel, and obtain the graphics rendering instruction having the remote mapping relationship with the client environment system from the graphics rendering library.

18. The apparatus according to claim 17, wherein the graphics rendering library comprises an encapsulation component having an instruction encapsulation function; and the processor is further configured to:

standardize the graphics rendering instruction through the encapsulation component, and transmit a standardized graphics rendering instruction to the graphics rendering drive through the graphics rendering node;

access the physical rendering device associated with the frame buffer based on the hierarchical relationship between the graphics rendering drive and the physical rendering device; and perform intra-container rendering on the game data corresponding to the game process through the graphics rendering function of the physical rendering device, and use rendered game data as the rendered game data corresponding to the game process.

19. The apparatus according to claim 16, wherein the buffer allocator manages an entire life cycle of the frame buffer; and the processor is further configured to:

destruct, when detecting that a process state of the game process is an end state, the frame buffer corresponding to the game process through the buffer allocator.

20. A non-transitory computer-readable storage medium, storing a computer program, the computer program comprising program instructions, the program instructions, when executed by a processor, causing the processor to perform:

receiving a request transmitted by a game client to obtain cloud gaming data;

starting a game process according to the request to obtain the cloud gaming data in a cloud container corresponding to the game client, wherein the cloud container comprises a reconstructed system graphics stack comprising: the game process, a buffer allocator, a graphics rendering node, a graphics rendering drive, and a physical rendering device;

allocating, in the cloud container, a frame buffer for the game process;

invoking, in response to the frame buffer being allocated, a graphics rendering library in the cloud container to obtain a graphics rendering instruction;

invoking, when the buffer allocator allocates the frame buffer for the game process based on a buffer allocation instruction, the graphics rendering drive through the graphics rendering node having an association with the buffer allocator, to allocate a video memory corresponding to the frame buffer in the physical rendering device having a hierarchical relationship with the graphics rendering drive;

accessing the physical rendering device associated with the frame buffer based on the graphics rendering instruction, and performing intra-container rendering on game data corresponding to the game process through the physical rendering device, to obtain rendered game data corresponding to the game process; and generating a composited game picture according to the rendered game data.

* * * * *